US007413394B2

(12) United States Patent
Risser

(10) Patent No.: US 7,413,394 B2
(45) Date of Patent: *Aug. 19, 2008

(54) LOW HEADROOM TELESCOPING BRIDGE CRANE SYSTEM

(75) Inventor: Philip E. Risser, Leola, PA (US)

(73) Assignee: Transol Corporation, Morgantown, PA (US)

( * ) Notice: Subject to any disclaimer, the term of this patent is extended or adjusted under 35 U.S.C. 154(b) by 644 days.

This patent is subject to a terminal disclaimer.

(21) Appl. No.: 10/481,349

(22) PCT Filed: Jun. 25, 2002

(86) PCT No.: PCT/US02/20057

§ 371 (c)(1),
(2), (4) Date: Nov. 12, 2004

(87) PCT Pub. No.: WO03/004308

PCT Pub. Date: Jan. 16, 2003

(65) Prior Publication Data

US 2005/0105996 A1 May 19, 2005

(51) Int. Cl.
*B60P 1/54* (2006.01)
(52) U.S. Cl. ............... 414/542; 212/74; 254/2 R; 414/561
(58) Field of Classification Search .......... 414/522, 414/540, 541, 542, 560, 561; 212/180, 250, 212/343, 344; 104/106, 107, 111
See application file for complete search history.

(56) References Cited

U.S. PATENT DOCUMENTS

| 2,751,095 | A | * | 6/1956 | Haverstick et al. ........ 414/542 |
| 3,482,715 | A | * | 12/1969 | Worthington ............. 414/542 |
| 3,482,716 | A | | 12/1969 | Leadley |
| 4,297,071 | A | | 10/1981 | Dunbar |
| 4,360,307 | A | | 11/1982 | Larsson |
| 4,425,071 | A | | 1/1984 | Dunbar |
| 5,062,760 | A | | 11/1991 | Samaniego |
| 5,338,147 | A | | 8/1994 | Kucharczyk et al. |

(Continued)

FOREIGN PATENT DOCUMENTS

DE 7507712 9/1975

(Continued)

OTHER PUBLICATIONS

European Seach Report corresponding to PCT/US02/20057.

(Continued)

*Primary Examiner*—Saul J. Rodriguez
*Assistant Examiner*—Michael S Lowe
(74) *Attorney, Agent, or Firm*—Caesar, Rivise, Bernstein, Cohen & Pokotilow, Ltd.

(57) ABSTRACT

A telescoping bridge crane system arranged to be mounted over a floor of a structure, e.g., a vehicle trailer, and including a pair of enclosed mounting tracks for slidably supporting a runway frame. Trucks are located within the tracks. Each truck includes a hanger. The runway frame also includes two enclosed tracks which are directly supported by the hangers and located beside and parallel to the mounting tracks. A bridge section is mounted between the enclosed tracks of the runway frame by another pair of trucks. The a bridge section supports an extremely low headroom hoist assembly including an actuator, a cable, plural rotatable sheaves and a hook.

30 Claims, 20 Drawing Sheets

U.S. PATENT DOCUMENTS 5,743,702 A 4/1998 Gunderson
6,126,379 A 10/2000 Feldman et al.
7,134,831 B2 * 11/2006 Risser ........................ 414/542

FOREIGN PATENT DOCUMENTS

| | | |
|---|---|---|
| DE | 4216709 | 11/1993 |
| DE | 4424655 | 1/1996 |
| GB | 2202510 | 9/1988 |
| GB | 2274094 | 7/1994 |

OTHER PUBLICATIONS

Brochure entitled MET-TRACK® by Spanco, Inc.

* cited by examiner

LOW HEADROOM TELESCOPING BRIDGE CRANE SYSTEM

BACKGROUND OF THE INVENTION

This invention relates generally to material handling equipment, and more particularly to a telescoping bridge crane system particularly arranged to be mounted over a floor of a structure, e.g., in the interior of the body of a truck, to provide maximum headroom between it and the floor of the structure.

Various bridge crane systems and devices are commercially available for use in over-the-road vehicles, such as trailer bodies, vans, trucks, and the like to enable the vehicle to be loaded and unloaded. For example, some devices and systems make use top running bridges mounted within the trailer adjacent the ceiling. In order to extend out of the trailer such bridges make use of hinged runways which are arranged to be held within a stowed position within the interior of the trailer body, and then to fold out of the rear of the trailer so that a portion extends beyond the end of the trailer to facilitate the loading and unloading of the trailer. This approach limits the storage space within the trailer in order to maintain clearance for the movement of the folding runway. It also requires a set-up procedure before the system is ready for use.

So-called "enclosed track" bridge crane systems solve the problem of load-lifting coverage beyond the runway and bridge envelope by utilizing telescoping bridges or runways each formed of an elongated hollow track section. In particular, at least one enclosed track is mounted horizontally at an elevated position and includes at least one wheel truck or trolley arranged to roll therein. The truck(s)/trolley(s) serve to suspend another enclosed track horizontally below the upper track. The lower enclosed track can be extended longitudinally with respect to the upper enclosed track, i.e., the truck(s)/trolley(s) can be rolled along the upper track from a stowed or a retracted position within the upper track to an extended position (also within the upper track but closer to its rear end). This action enables the lower track to be extended substantially beyond the rear end of the upper track section. A hoist or other lifting member can be mounted directly or indirectly on the lower track to enable the lifting of some load. Examples of such bridge crane systems are commercially available under the trademark MET-TRACK® Stand Alone Workstation Bridge Cranes from Spanco, a division of Transol Corporation, the assignee of the subject application.

Wayne Engineering Corporation of Cedar Falls, Iowa sells a vehicle-mounted overhead traveling crane and including a low headroom hoist under the trademark CargoMaster®.

While the use of upper and lower enclosed tracks requires no additional set-up, it nevertheless also results in the loss of valuable headroom, particularly if the system is utilized in a confined space, such as within a trailer or other hollow vehicle body. Moreover, such telescoping or runways must be located directly below the fixed (upper) track or runway to prevent moment loading on the truck(s)/trolleys supporting the lower track or runway, since such trucks/trolleys are not typically amenable for supporting moment loads.

Examples of other types of prior art devices and systems for enabling a vehicle body to be loaded and unloaded are also found in U.S. Letters Pat. Nos.: 4,360,307 (Larsson), 4,425,071 (Dunbar), 5,062,760 (Samaniego), 5,338,147 (Kucharczyk et al.), 5,743,702 (Gunderson), and 6,126,379 (Feldman et al.).

While the aforementioned prior art devices and systems may be suitable for their intended purposes they never the less leave much to be desired from one or more standpoints, e.g., taking up considerable headroom in the interior of the vehicle, complexity, cost, ease of operation, ability to handle loads extending substantially beyond the bounds of the vehicle interior, etc.

SUMMARY OF THE INVENTION

This invention entails a system, e.g., a low headroom telescoping bridge crane system, for suspending a load over a floor, e.g., the floor of a vehicle, such as a truck body, or a static structure, such as a building. The system comprises a first, second, third, and fourth elongated, enclosed, hollow tracks, plural elongated cross members, a plurality of trucks (e.g., wheeled carriages), and a plurality of generally U-shaped hangers. Each of the tracks includes a longitudinally extending slot. Each of the hangers has a downwardly extending leg, an intermediate section and an upwardly extending leg.

The first and second tracks are disposed parallel to each other over the floor. The third and fourth tracks are also disposed parallel to each other and are interconnected by at least one of the cross members to form a runway frame. A first one of the trucks is located within the first track and arranged to move along the interior of the first track. A second one of the trucks is located within the second track and arranged to move along the interior of the second track. The first truck is connected to a downwardly extending leg of a first of the hangers, with a portion of the first hanger passing through the slot in the first track, and with the upwardly extending leg of the first hanger being connected to the third track to support the third track beside and parallel to the first track. The second truck is connected to a downwardly extending leg of a second of the hangers, with a portion of the second hanger passing through the slot in the second track, and with the upwardly extending leg of the second hanger being connected to the fourth track to support the fourth track beside and parallel to the second track, whereupon the runway frame is disposed horizontally between the first and second tracks and can be slid in a horizontal plane from a retracted position to an extended position and vice versa.

In accordance with one exemplary embodiment of this invention two trucks are located in each of the first and second tracks to support respective portions of the third and fourth tracks making up the runway frame. In addition, a bridging section is provided extending between the third and fourth tracks of the runway frame and is supported from movement therealong by a pair of trucks located within the third and fourth tracks of the runway frame. A hoist or other lifting member may be mounted on the bridging section.

In accordance with another exemplary embodiment of this invention the system comprises a first, second, third, and fourth elongated, enclosed, hollow tracks, plural elongated cross members, a plurality of trucks, and an extremely low headroom hoist assembly.

The first and second tracks are disposed parallel to each other over the floor in a common horizontal plane. The third and fourth tracks are disposed parallel to each other and are interconnected by at least one of the cross members to form a runway frame. The runway frame is slidably mounted by a pair of the trucks in the common horizontal plane between the first and second tracks. The runway frame is arranged to be slid in the common horizontal plane from a retracted position to an extended position and vice versa and comprises a bridge member located between the third and fourth tracks in the common horizontal plane.

The low headroom hoist assembly is mounted on the bridge member and comprises an actuator, a flexible cable, plural sheaves and a hook. The actuator includes a housing fixedly secured on the bridge member in the common horizontal plane and an extendable member also located in the common horizontal plane. The extendable member is arranged to be moved with respect to the housing from a fully retracted position to a fully extended position and vice versa. The cable is coupled to the extendable member.

A first one and a second one of the sheaves of the hoist assembly are mounted on the bridge member in the common horizontal plane and are spaced from each other. The first and second sheaves are rotatable about respective horizontal axes. The axes of the first and second sheaves are parallel to each other and are located in the common horizontal plane. The hook is secured to a third sheave. The third sheave is rotatable about a horizontal axis and is arranged to be moved between a fully retracted positioned, wherein said third sheave is located between the first and second sheaves, and a fully extended position, wherein said third sheave is located below said first and second sheaves. The cable extends from the extendable member over the first sheave, under the third sheave, and over the second sheave for fixed securement to the bridge member.

The movement of the extendable member of the actuator to the fully retracted position with respect to the housing causes the cable to slide with respect to at least some of the sheaves to move the third sheave to the fully retracted position between the first and second sheaves and in the common horizontal plane, thereby raising the hook to the maximum distance above the floor. The movement of the extendable member to the fully extended position with respect to the housing enables the cable to slide with respect to at least some of the sheaves so that the third sheave moves downward under the force of gravity, thereby lowering the hook toward the floor.

DETAILED DESCRIPTION OF THE PREFERRED EMBODIMENT

Figure 1:
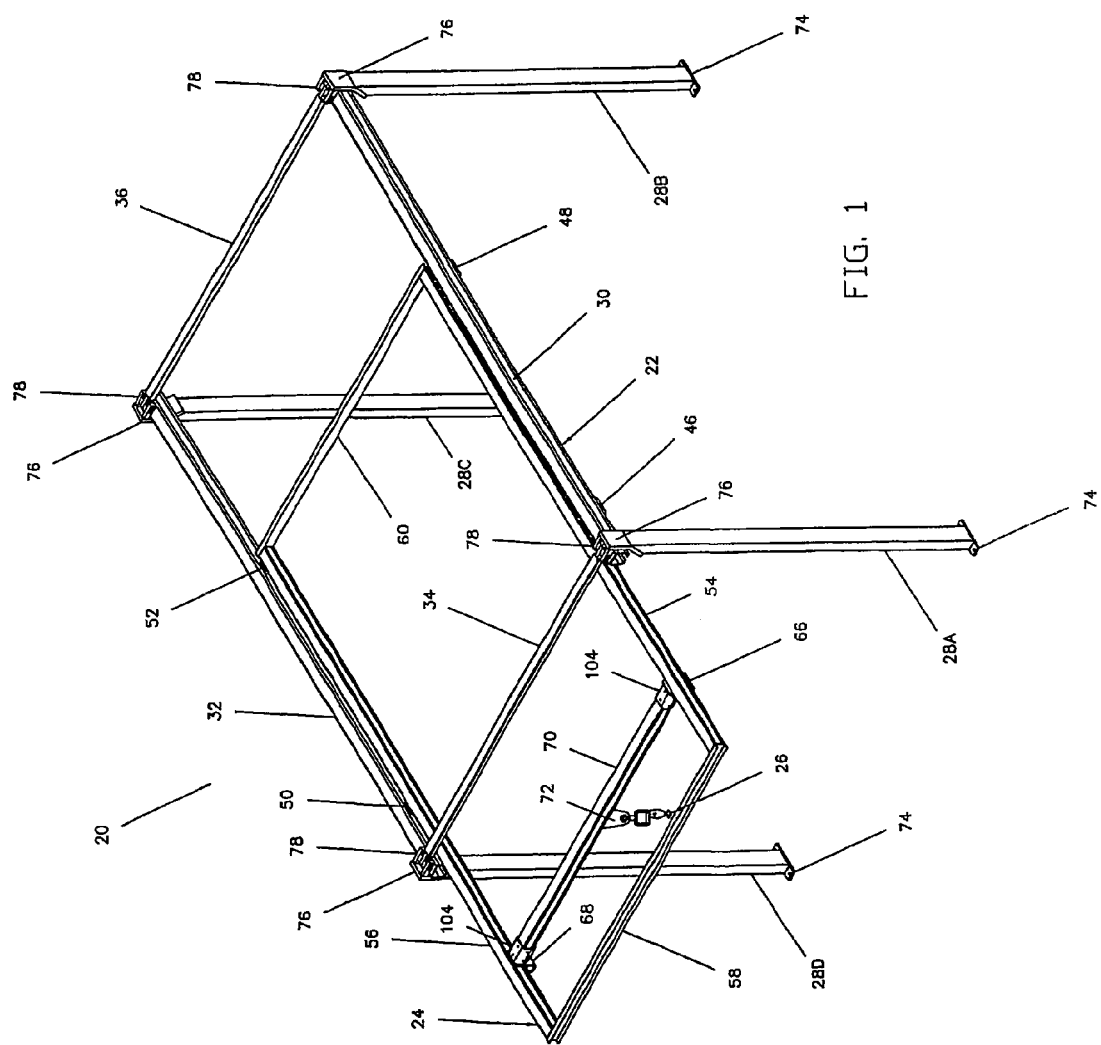
FIG. 1 is an isometric view of one exemplary embodiment of system for suspending a load over a floor, which system can be mounted within the interior of the hollow body of a vehicle, such as a truck, van, trailer, etc., or within a static structure, such as a building, or at an outside location, such as within a work-yard, and the system in its extended position to enable a load to be lifted externally of the vehicle's body to be carried into the body or lifted internally and carried externally.

In FIG. 1 there is shown one exemplary embodiment of a low headroom telescoping bridge crane system 20 constructed in accordance with the subject invention. The system 20 makes use of a pair of elevated runways for supporting an extendable retractable runway frame therebetween, with the runway frame carrying a bridge section on which a conventional "end-effector" or a "below-the-hook" lifting device, such hoist, balancer, vacuum lifter, etc. is mounted. The system 20 has particularly suitability for mounting or disposition within the hollow body of a vehicle, e.g., in an over-the-road trailer, a truck, a van, etc., to facilitate the loading and unloading of the vehicle's body. However, it must be pointed out at this juncture that the system 20 can also be used in a static environment, e.g., within a building, in a yard or other open area, etc. To that end, the subject invention can be used in any application which requires low headroom and reach beyond the envelope of the system to lift and maneuver loads thereat. In mobile environments, such as when the system 20 is used in a truck or van body like shown in FIG. 10 (and which will be described later), the system is mounted so that its runways and the supported runway frame assembly are located in the same plane immediately adjacent the ceiling or roof of the vehicle's hollow body, e.g., the trailer. This low headroom arrangement provides maximum space between it, the lifting device suspended from the bridge section of the runway frame assembly, and the floor of the structure in which the system is mounted.

As best seen in FIG. 1, the system 20 basically comprises support frame assembly 22, including the pair of heretofore mentioned runways, the heretofore mentioned runway frame assembly 24, and a conventional lifting device, e.g, hoist 26. In the exemplary embodiment shown herein, the support frame assembly 22 comprises plural, e.g., four, upright support columns or posts 28A, 28B, 28C, and 28D, a pair of outside tracks 30 and 32, plural, e.g., two, cross members 34 and 36, plural, e.g., four, trolleys or trucks 38, 40, 42, and 44 (FIGS. 4 and 7) and associated hangers 46, 48, 50, and 52. The outside tracks 30 and 32 make up the heretofore identified pair of runways and are arranged to slidably support the support frame assembly 24 therebetween.

The runway frame assembly 24 comprises a pair of inside tracks 54 and 56, plural, e.g., two, cross members 58 and 60, a pair of trolleys or trucks 62 and 64 (FIGS. 6 and 7), a pair of hangers 66 and 68 (FIGS. 2 and 6), and a bridge section 70. The bridge section 70 serves to support, e.g., suspend, the lifting device 26 therefrom, and in the exemplary embodiment shown herein is in the form of an enclosed track (to be described later) including a trolley 72 from which the lifting device 26 is suspended.

The two outside tracks 30 and 32 forming the system's runways are disposed parallel to each other and in the same elevated horizontal plane by the plural, hollow support columns 28A, 28B, 28C, and 28D. As mentioned earlier the outside tracks (runways) serve to support the runway frame assembly 24 between them and in the same plane as the outside tracks 30 and 32. The mounting of the runway frame assembly 24 between the outside tracks 30 and 32 is effected by use of the trucks/trolleys 38, 40, 42, and 44 and the associated hangers 46, 48, 50, and 52, respectively. When so mounted the runway frame assembly 24 is arranged to be slid down the runways 30 and 32 between a retracted position (to be described in detail later) wherein the runway frame assembly is located within the "envelope" of the mounting frame assembly 22 (i.e., the cross members 34 and 36) and a fully extended position (also to be described later) wherein a portion of the runway frame assembly is located beyond the "envelope" of the mounting frame assembly, and vice versa. In fact, the runway frame assembly can be located at any intermediate position between the retracted and fully extended positions.

Figure 7:
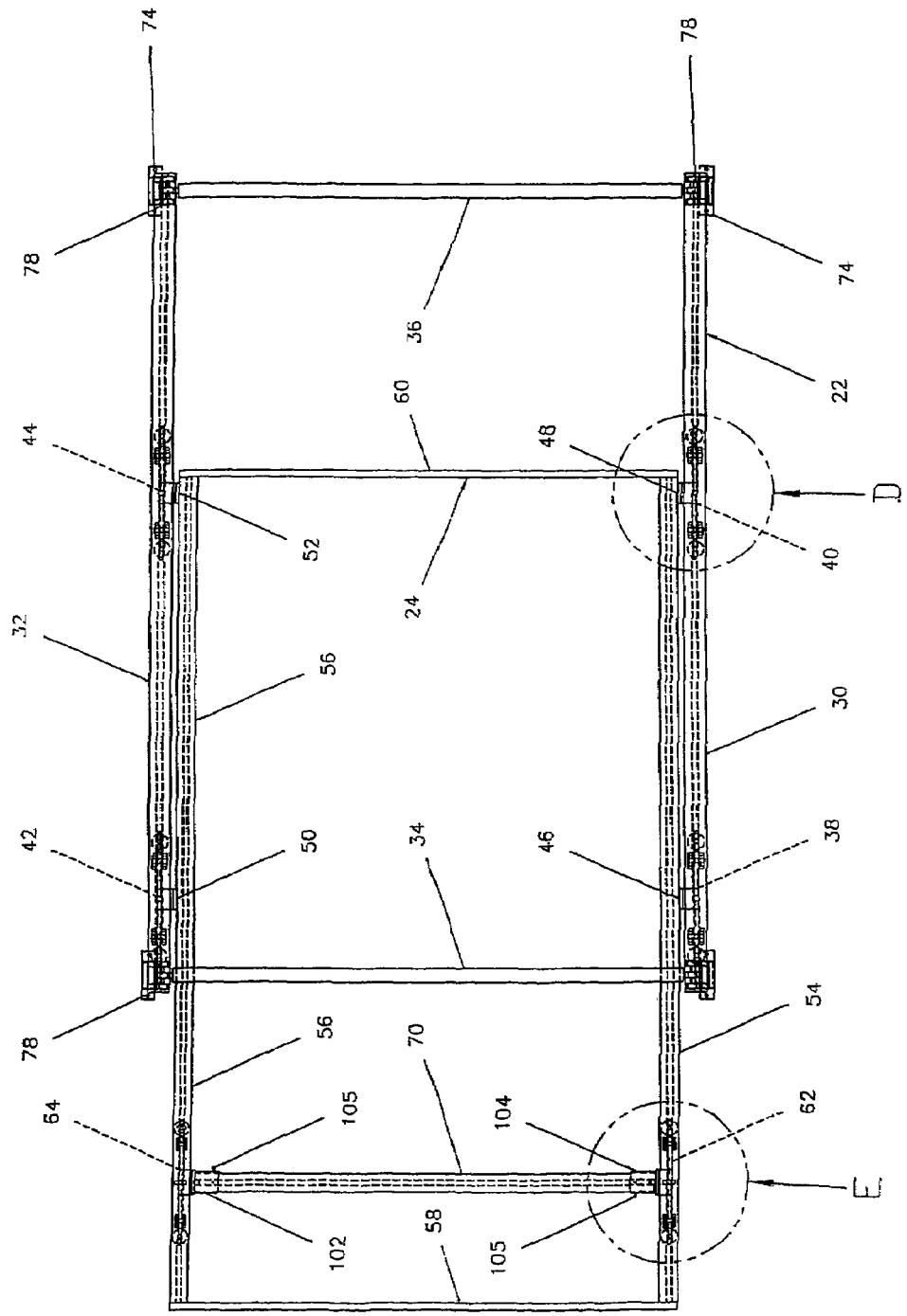
FIG. 7 is a plan view of the system shown in FIG. 1.
Figure 8:
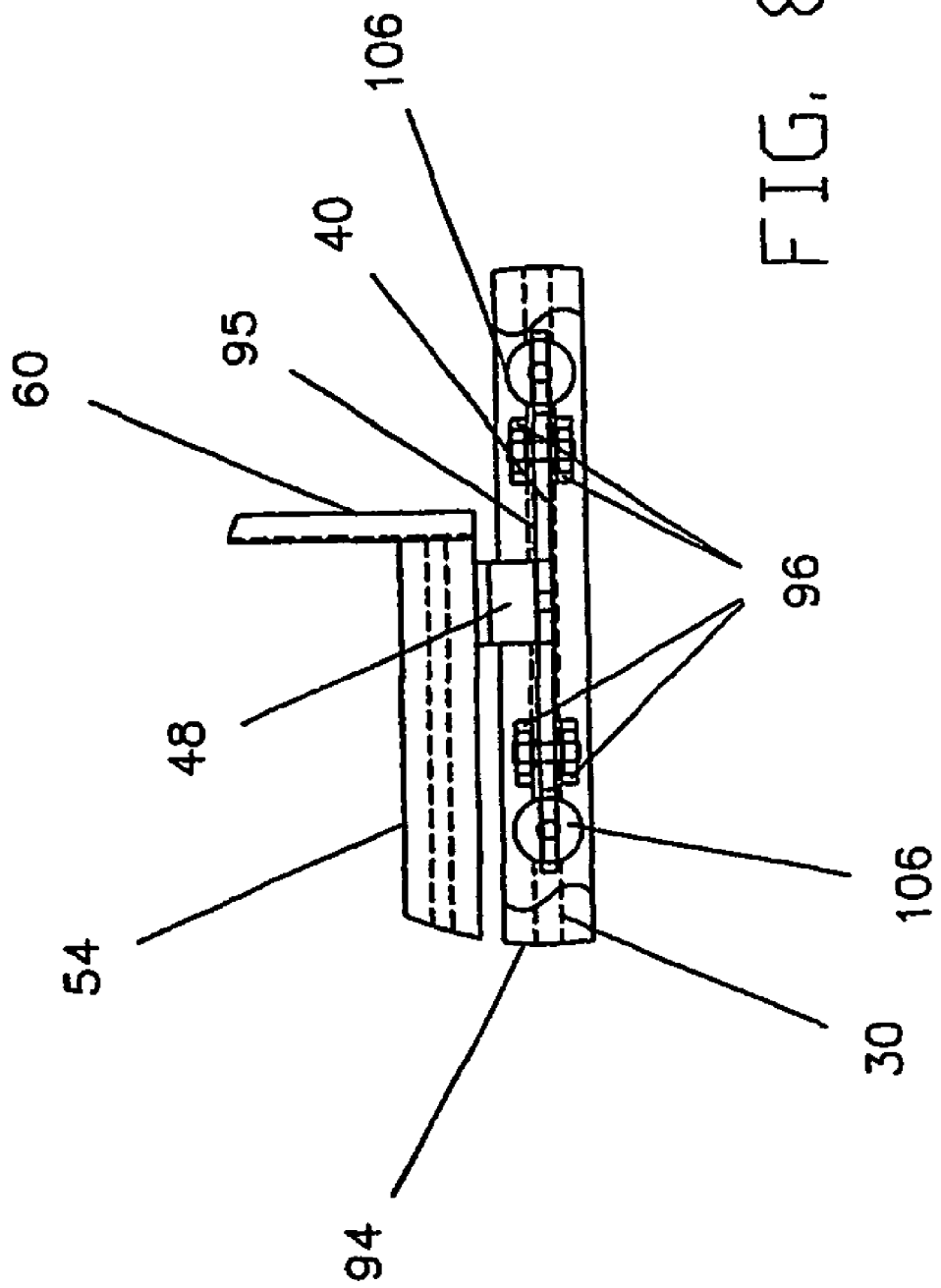
FIG. 8 is an enlarged plan view of a portion of the system shown within the circular area "D" in FIG. 7.

As best seen in FIGS. 1 and 7 the bridging section 70 is mounted transversely with respect to the inside tracks 54 and 56 via the trolleys 62 and 64, respectively, and their associated hangers 66 and 68, respectively, so that the bridging section can be located at any longitudinal position along the tracks 54 and 56.

As mentioned earlier, the support columns 28A, 28B, 28C, and 28D are arranged to support the runways 30 and 32 at the elevated horizontal position. In accordance with the exemplary embodiment shown herein each of the support columns is of identical construction and is in the form of an elongated linear hollow member formed of any suitable strong material, e.g., steel. Each member includes a flanged lower end in the form of a base plate 74 for mounting the column in a vertical orientation on the floor of the vehicle body or on any other surface, e.g., the floor of a building or the ground of a yard, in which the system 20 is to be located. The upper end of each support column includes an angular connector flange 76 to which a horizontal support yoke 78 is fixedly secured, e.g., welded. As will be described shortly, each horizontal support yoke 78 is arranged to suspend a portion of an associated one of the outside tracks 30 and 32 below it and to enable the tracks to be adjusted with respect to each other to maintain their parallelism. In addition, each yoke supports a respective end of an associated cross member 34 or 36. To that end, each yoke includes a pair of spaced apart arms which are fixedly secured, e.g., welded, to an associated end of an associated cross member 34 or 36.

Figure 2:
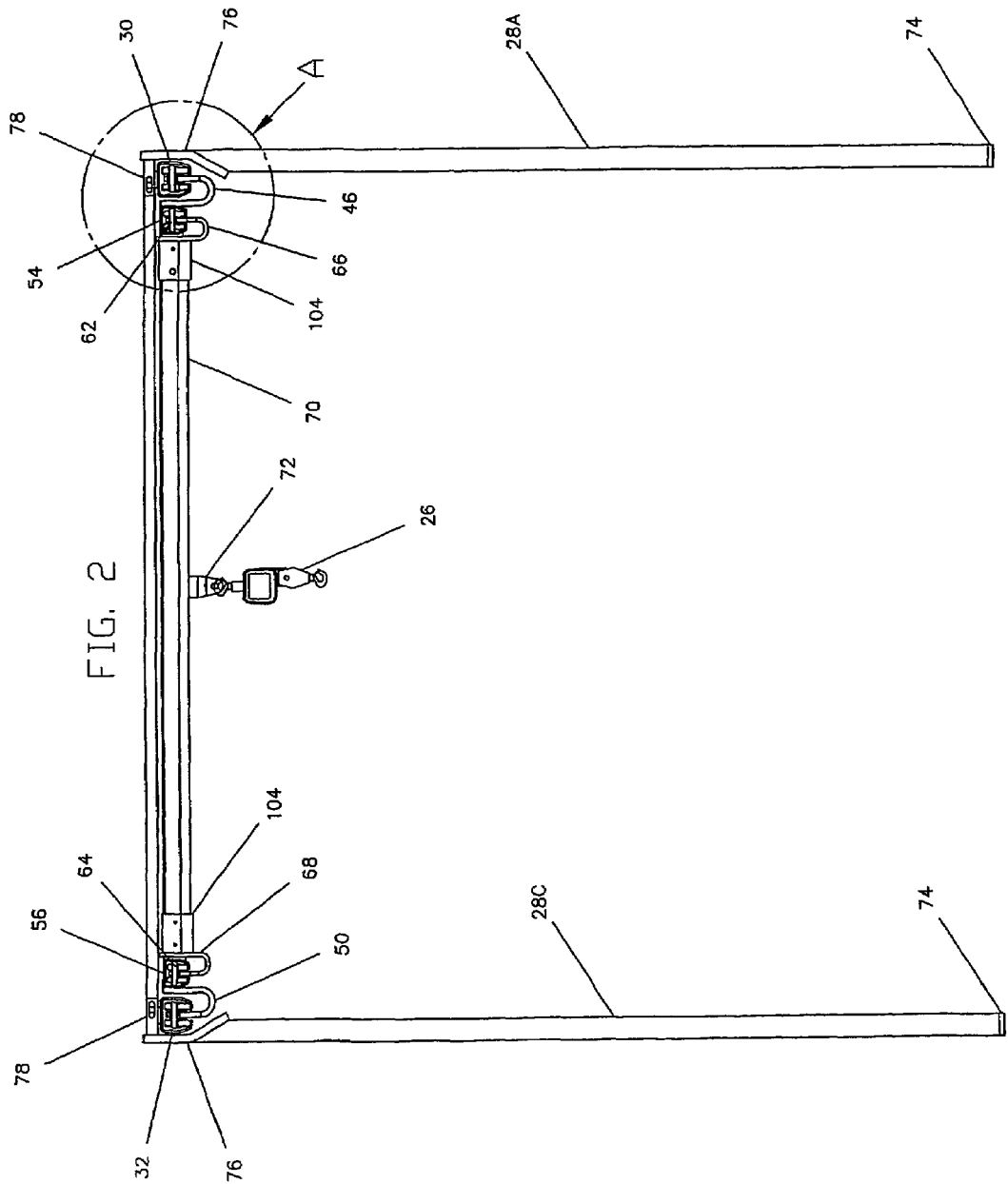
FIG. 2 is an enlarged end view of the system shown in FIG. 1.
Figure 3:
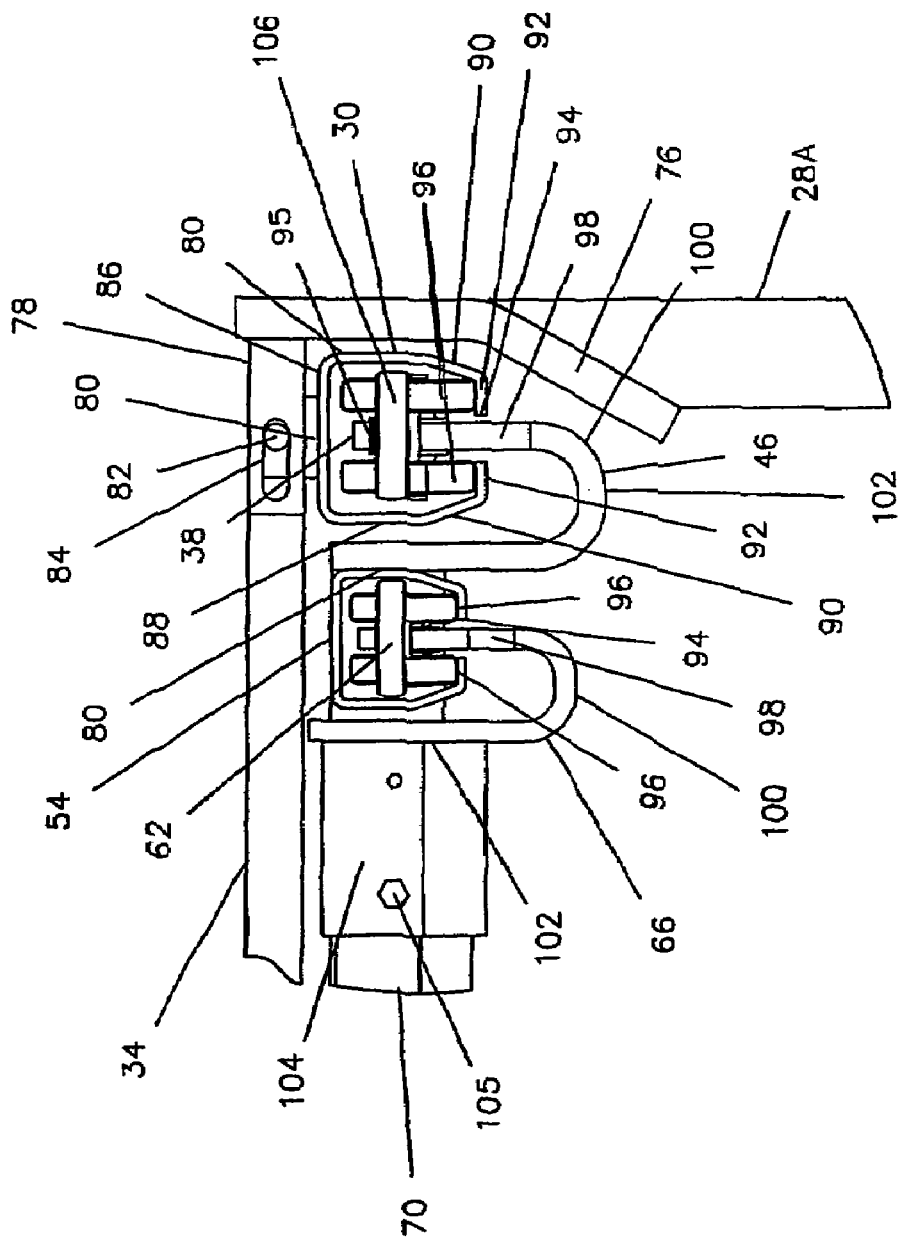
FIG. 3 is a front elevational view of a portion of the system shown within the circular area "A" in FIG. 2.

As best seen in FIGS. 2 and 3, the cross member 34 is fixedly secured between the horizontal support yokes 78 on the columns 28A and 28C, while the cross member 36 is fixedly secured between the horizontal support yokes on the columns 28B and 28D (FIG. 1). The securement of the ends of the cross members to their respective yoke arms is accomplished by welding or some other attachment means, e.g., rivets, threaded fasteners, etc.

The cross members 34 and 36 are preferably mounted as close as possible above the outside tracks 30 and 32 to minimize the system's headroom. To that end, each support yoke 78 includes a hollow interior space between its arms in which a slidable hanger member 80 is located and suspended. Each slidable hanger member 80 comprises a short height bar or rod disposed vertically and having a pair of rod-like arms 82 projecting horizontally therefrom in opposed diametric directions. Each of the arms 82 is located within a respective horizontally disposed elongated slot 84 in the pair of spaced arms making up the horizontal support yoke to enable the slidable hanger member 80 to be slid to any longitudinal position along the slot 84. The lower end of each slidable hanger member 80 is fixedly secured (e.g., welded) to the top wall (to be described hereinafter) of a portion of one of the two outer tracks 30 and 32 to suspend that track from the support yoke immediately below it. Thus, the runway track 30 or 32 to which the hanger member 80 is secured is disposed and supported immediately below its associated cross frame member. Since each slidable hanger member 80 can be slid along the associated slots 84 in its associated yoke 78 the spacing between the two outside tracks 30 and 32 can be adjusted as desired. This enables the user of the system 20 to ensure that the tracks 30 and 32 are maintained parallel to each other, since any skewing of those tracks could interfere with the smooth sliding of the runway frame assembly 24 therebetween.

In the exemplary embodiment shown in FIG. 1, the columns 28B and 28D are located at the far ends of the two outside tracks 30 and 32 to support those ends of the tracks via their associated yokes and hangers. The other columns 28A and 28C are located at the near ends of the two outside tracks 30 and 32 to support those ends of the tracks via their associated yokes and hangers. It should be noted at this juncture that while the system 20 is shown in FIG. 1 as comprising four support columns, the system can make use of more or less such members to support the outside tracks at the elevated horizontal position, depending upon the length of the tracks and other matters, e.g., the amount of additional bracing that is utilized, etc.

Turning now to FIGS. 1-3 the details of each of the outside tracks 30 and 32 will now be discussed. As can be seen each track is of a conventional "enclosed-type" construction. One particularly suitable enclosed track is that sold by Spanco, a division of Transol Corporation, the assignee of this invention, under the trademark Met-Track®. Each track 30 and 32 is an elongated member, formed of a strong material, e.g., steel, having a horizontally disposed top wall 86, a pair of vertical sidewalls 88 projecting downward from the top wall, a pair of angularly located sidewalls 90 located below the vertical sidewalls 88, and a pair of horizontally disposed flanges 92 projecting inward from the ends of the angularly located sidewalls 88 to form a slot 94 therebetween. Each track 30 and 32 is arranged to receive at least one truck/trolley (to be described hereinafter) to slidably support the runway frame assembly 24 between the tracks. In the exemplary embodiment the trucks/trolleys 38 and 40 are located within the interior of the outside track 30, while the trucks/trolleys 42 and 44 are located within the interior of the other outside track 32. All of the trucks/trolleys 38, 40, 42, and 44 are of the same construction and will be described in detail later. Suffice it for now to state that each basically comprises a movable body member 95 having plural wheels or rollers 96 which are arranged to roll on respective inner surfaces of the flanges 92 on opposite sides of the slot 94 in the track in which the trolley is mounted. In accordance with one preferred exemplary embodiment of this invention each of the trucks is of conventional construction, such as that sold by Spanco, a division of Transol Corporation, as part of the MET-TRACK® system.

As mentioned earlier, each truck/trolley includes a hanger secured thereto. Each hanger is a generally U-shaped member which serves as the means for supporting a portion of the associated inside tracks 54 and 56 of the runway frame assembly 24. To that end, as best seen in FIG. 3, the hanger associated with each truck/trolley mounted in an outside enclosed track basically comprises generally a U or J-shaped member having a first downwardly extending leg section 98, a transversely extending, e.g., arcuate, intermediate section 100, and an upwardly extending leg section 102. The downwardly extending leg section is mounted on the trolley body 95 so that it extends downward through the slot 94 in the enclosed track. Accordingly, when the truck/trolley rolls along the flanges of that track, the downwardly extending section 98 does not bear against either edge of the flange forming the slot 94. Each hanger is of a rigid construction and formed of a strong material, e.g., steel. The outer surface of each of the upstanding leg portions 102 of each hanger 38-44 is fixedly secured, e.g., welded, to a respective portion of a respective one of the inside track sections 54 and 56 forming the runway assembly 24. As best seen in FIG. 3, each track of the runway frame assembly 24 is of the same general shape as the externally located enclosed tracks 30 and 32 of the support frame assembly, but is of slightly smaller cross-sectional area. In the interest of brevity, the portions of the runway frame assembly tracks will be given the same reference numerals as the runway tracks 30 and 32. The outside downwardly extending vertical wall 80 of each of the runway assembly tracks 54 and 56 is secured to the outer surface of the upstanding end or leg portion 102 of each of the hangers connected to the trolleys in the outside enclosed track sections 30 and 32 so that the tracks 54 and 56 of the runway frame assembly are located parallel to and beside (inside) the outside enclosed tracks 30 and 32, respectively, i.e., at virtually the same height with respect to the floor.

Figure 6:
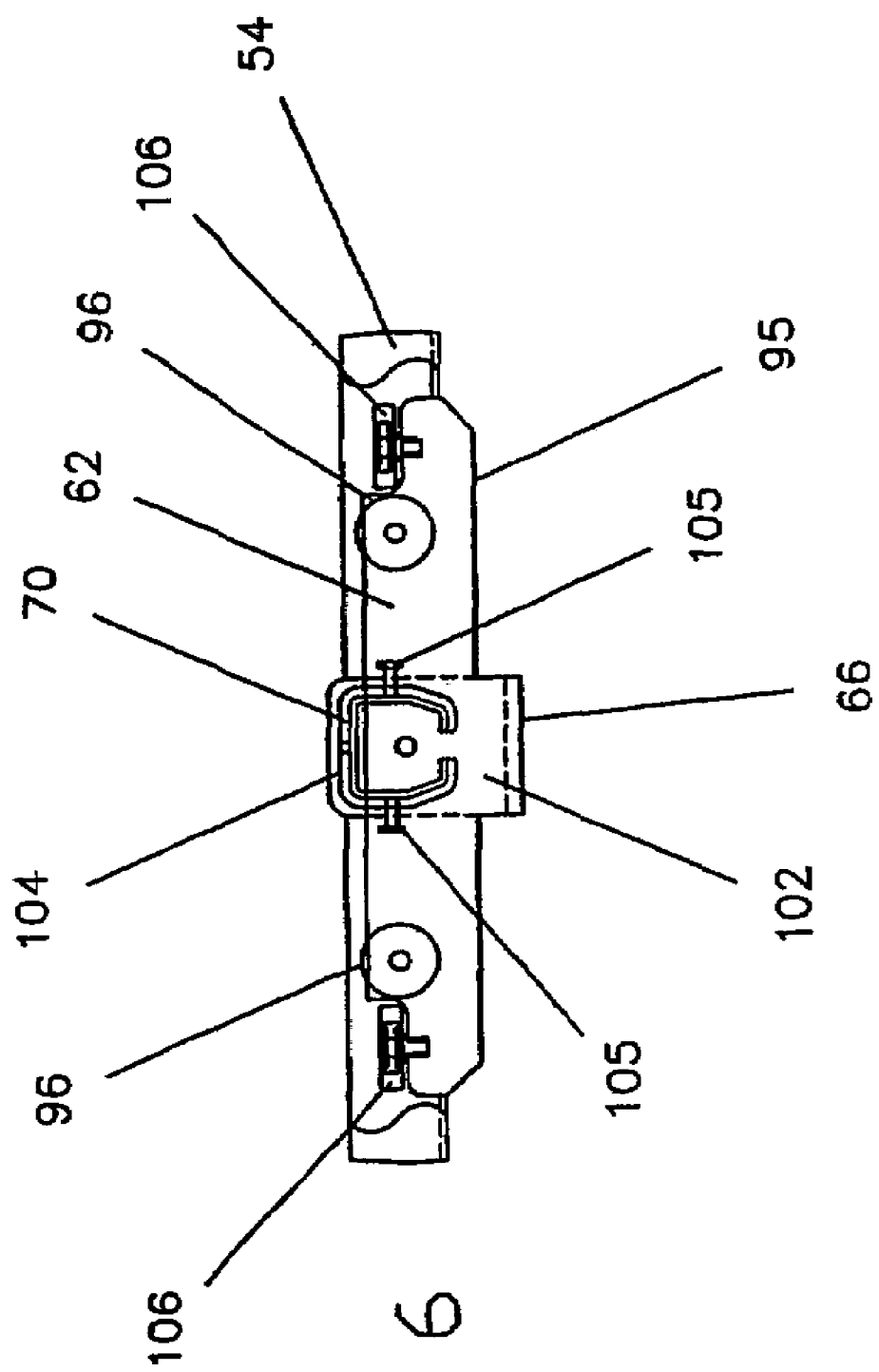
FIG. 6 is an enlarged side elevational view of a portion of the system shown within the circular area "C" in FIG. 4.
Figure 9:
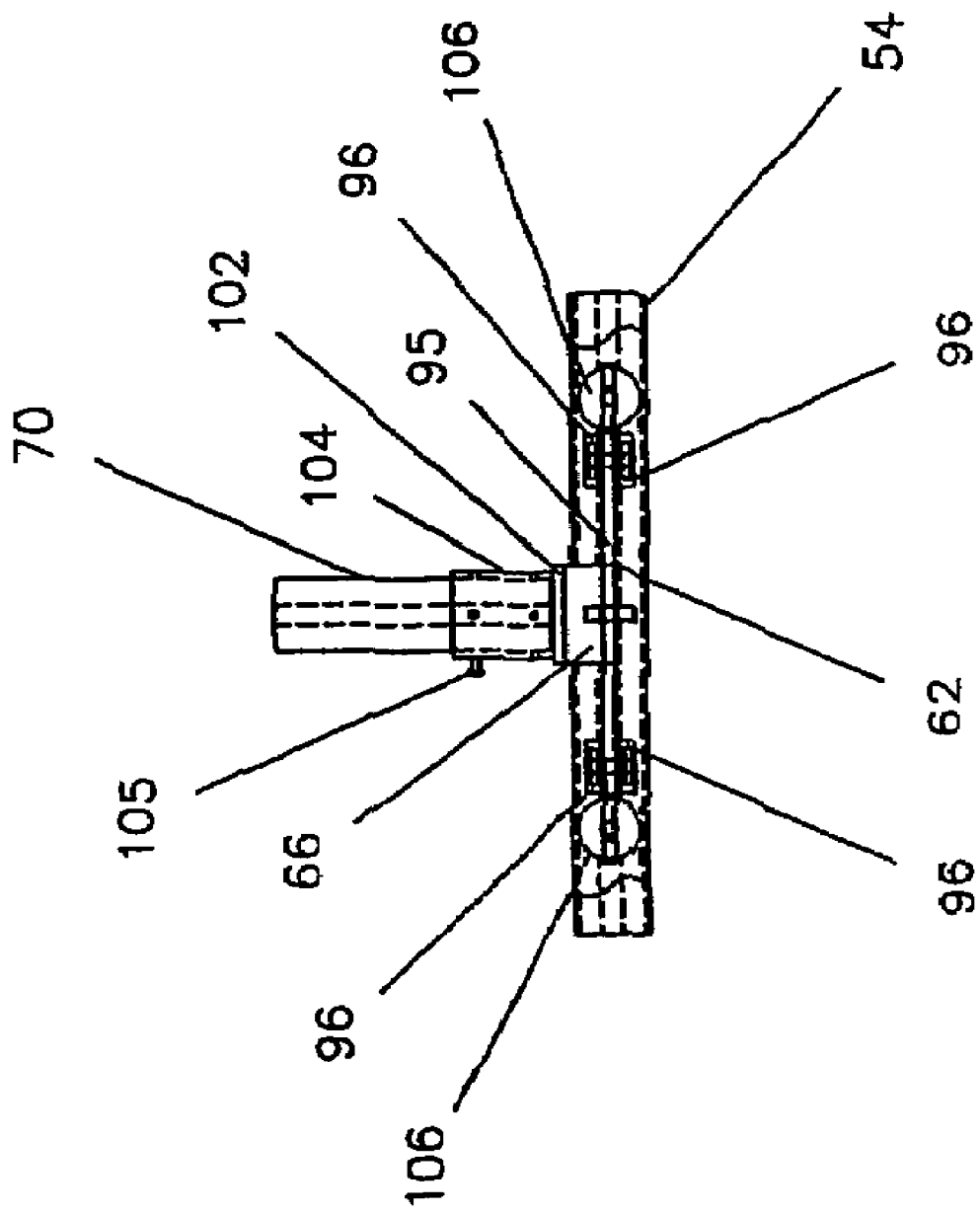
FIG. 9 is an enlarged plan view of a portion of the system shown within the circular area "E" in FIG. 7.

Each of the enclosed tracks 54 and 56 of the runway frame assembly includes a single truck/trolley located therein. Thus, track 54 includes truck/trolley 62 and track 56 includes truck/trolley 64. The truck/trolleys 62 and 64 of the runway are similar in construction to the truck/trolleys of the outside tracks 30 and 32 except that they are slightly smaller in size to fit within the smaller tracks. Thus each trolley includes plural rollers 96, and a body 95 from which a generally U or J-shaped hanger extends. Truck/trolley 62 supports hanger 66 therefrom, whereas truck/trolley 64 supports hanger 68 therefrom. Each hanger 66 and 68 is identical in construction to the heretofore identified hangers and will be given the same reference numerals in the interest of brevity. Thus, as can be seen in FIGS. 6 and 9, the upwardly extending leg 102 of hanger 66 is fixedly secured to a bracket or connector 104 at one end of the bridging section 70. The connector is a hollow member which is fixedly secured (e.g., welded) to the leg section 102 of hanger 66. One end of bridge section 70 is located within the connector 104 and is held in place by plural bolts 105 (FIG. 6). The bridging section 70 as noted above is an elongated, hollow frame-like member, e.g., an enclosed track like those of the runways 30 and 32, but of smaller cross sectional area. At the opposite end of the bridging section is another bracket or connector 104 which is also fixedly secured to the upwardly extending leg portion 102 of the hanger 68 connected to the truck/trolley 64 in the other enclosed track 56 of the runway frame assembly.

Figure 5:
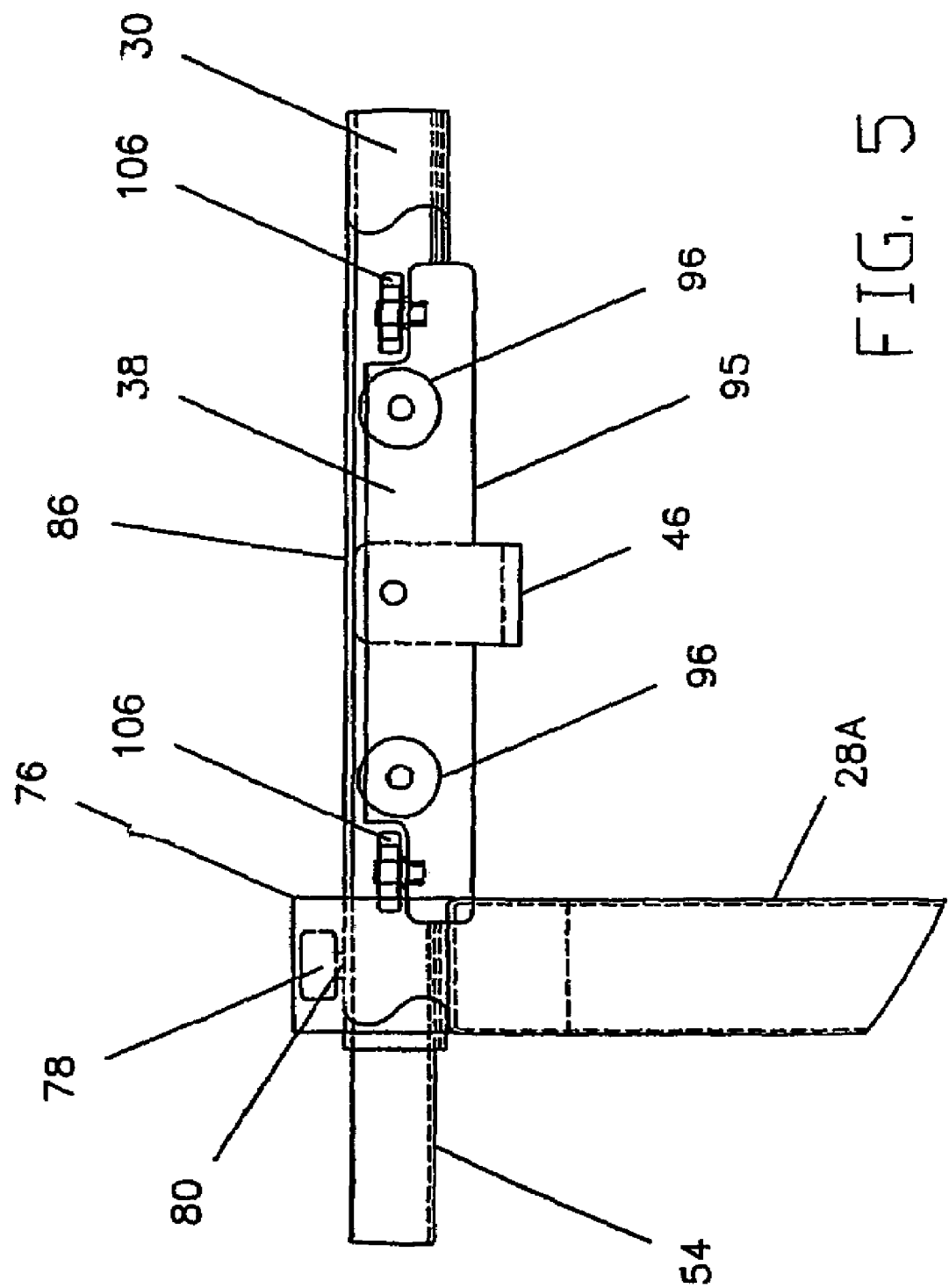
FIG. 5 is an enlarged side elevational view of a portion of the system shown within the circular area "B" in FIG. 4.

In FIGS. 5 and 6, the details of the various trucks/trolleys of the system 20 can best be seen. Thus, as can be seen in FIG. 5, the truck/trolley 38 which is located within the enclosed track 30 closest to the end cross member 34 basically comprises a body 95 having four rollers or wheels 96 mounted thereon (two on each side of the body) on horizontally disposed axles. Two of the wheels 96 are located to run along the inside surface of the flange 92 of the outer wall of that track while the opposite two wheels roll along the upper surface of the opposed flange. In order to keep the truck/trolley 38 centered within the enclosed track 30 so that the hanger 46 does not rub against the edges of the slot 94 while the truck/trolley rolls therealong, the truck/trolley includes a pair of horizontally disposed idler or centering rollers or wheels 106 mounted at opposed ends of the body 95. Each wheel 106 is mounted on an axle oriented vertically so that each wheel is disposed in a horizontal plane. The diameter of the wheels is such that they are able to make contact with the opposed inner surfaces of the two vertically extending walls 80 and 88 of the enclosed track 30. The other truck/trolley 40 in the enclosed track 30 is similarly constructed and arranged. The trolleys 42 and 44 of the other enclosed outside track 32 are also constructed in the same manner.

The trucks/trolleys 62 and 64 of the runway frame assembly 24 and which are located in the enclosed tracks 54 and 56 are of identical construction to the trucks/trolleys 38-44 except that they are of slightly smaller size. In the interest of brevity, the same reference numbers are given to the same parts of the trucks/trolleys 62 and 64 are given to the trucks/trolleys 38-44.

As mentioned earlier, the bridging section also preferably includes a trolley 72 therein for movably supporting a hoist or any other type of lifting mechanism 26 through the slot in the bottom of the track. The trolley 72 can be similar in construction to those described heretofore or can be of any other conventional construction. Thus, the hoist 26 can be moved to any longitudinal position along the length of the enclosed track forming the bridging section 70.

Figure 10:
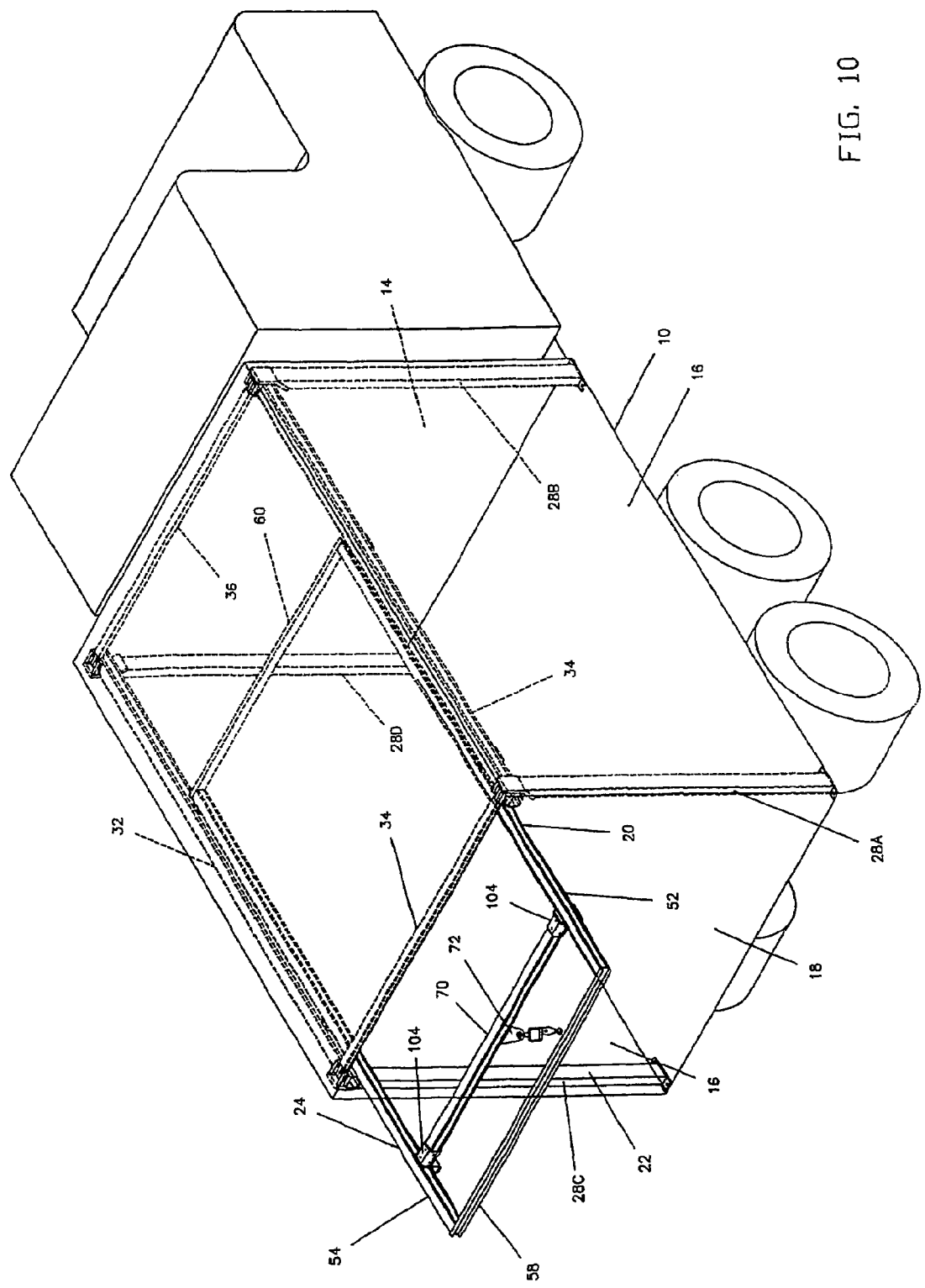
FIG. 10 is an isometric view of a vehicle, e.g., a truck, having the system of FIG. 1 located in its body.

Turning now to FIG. 10 there is shown the exemplary embodiment of a system 20 of this invention mounted within the hollow body 10 of a truck or van. The body 10 includes a top wall 12, a front wall 14, a pair of side walls 16, a floor 18, and a rear wall in the form of one or more openable doors (not shown). The system is mounted in the body 10 so that its support columns 28A-28D are secured to the floor 18. In the embodiment shown the support column 28B is located immediately adjacent the side wall 16 towards the front wall 14, the support column 28A is located immediately adjacent the side wall 16 towards the open rear wall, the support column 28D is located immediately adjacent the opposite side wall 16 towards the front wall 14, and the support column 28C is located immediately adjacent that side wall 16 towards the open rear wall. It should be pointed out at this juncture that the embodiment 20 shown makes use of four support columns and two cross members. That is merely exemplary. Thus, the system 20 can make use of one or more support columns for the runways, depending upon the type of loads to be handled, the length of the runways, the amount of bracing provided, etc.

As will be appreciated by those skilled in the art, when the system 20 is mounted within the hollow interior of a vehicle body as just described, the runway frame assembly 24 can be moved from any retracted position within the envelope of the support frame assembly 22, to any extended position, wherein some portion of the runway frame assembly extends beyond the open rear end of the vehicle body. Depending upon the length of the inside track members, the runway frame assembly can be extended out of the rear of the truck body a substantial distance (e.g., almost equal to half the length of the runway frame assembly itself). With special construction it could extend even further. Since the bridging section 70 can be moved to any longitudinal position on the runway frame assembly, the lifting device 26 that is suspended by the trolley 72 from the bridging section 70 can be precisely positioned at any distance beyond the rear of the body 10, up to the end of runway frame assembly. Moreover, the trolley 72 can be located to any position along the length of the bridging section. Thus, a load to be readily lifted into the truck body from virtually any position outside at the rear of the truck body. So too, a load can be lifted from virtually any position within the truck body and then the runway frame extended out of the truck body to a desired position and the bridging section and the hoist-supporting trolley can be moved to any position to deposit the load to virtually any position beyond the rear of the truck body. The runway frame assembly 24 can then be moved back to its retracted position for stowage.

It should be pointed out at this juncture that the system 20 need not be mounted by support columns, but can itself be suspended by any suitable means from a ceiling or other structure so that the runway tracks and the runway assembly disposed therebetween is at any desired horizontal position. Moreover, the runway tracks 30 and 32 and the runway frame assembly tracks need not be of the enclosed type. Thus each track may be of an I-beam or some other shape to support a trolley or truck to slide/roll therealong. So, too, other types of carriers can be used in lieu of the trolleys/trucks to extend/retract the runway frame assembly between the runway tracks.

Referring now to FIGS. 11-20 there is shown another exemplary embodiment 200 of this invention. The system 200 basically comprises similar components as system 20 including a support frame assembly 222 having a pair of elevated runways 30 and 32, which in turn support an extendable retractable runway frame 224 therebetween. The runway frame 224 carries a bridge section 70. The support frame assembly 222 is basically the same as the assembly 22, except that it includes six, upright support columns or posts. The runway frame 224 is also basically the same as that of system 20, except that it includes some additional bracing members or struts (to be described later). However, unlike the system 20, the system 200 makes use of an extremely low headroom hoist assembly 226 (to be described later) in lieu of the conventional lifting device or hoist 26 of system 20. Thus, in the interests of brevity the common components between the embodiments 20 and 200 will be given the same reference numerals and the details of their structure, interrelationship and operation will not be reiterated in detail.

Figure 4:
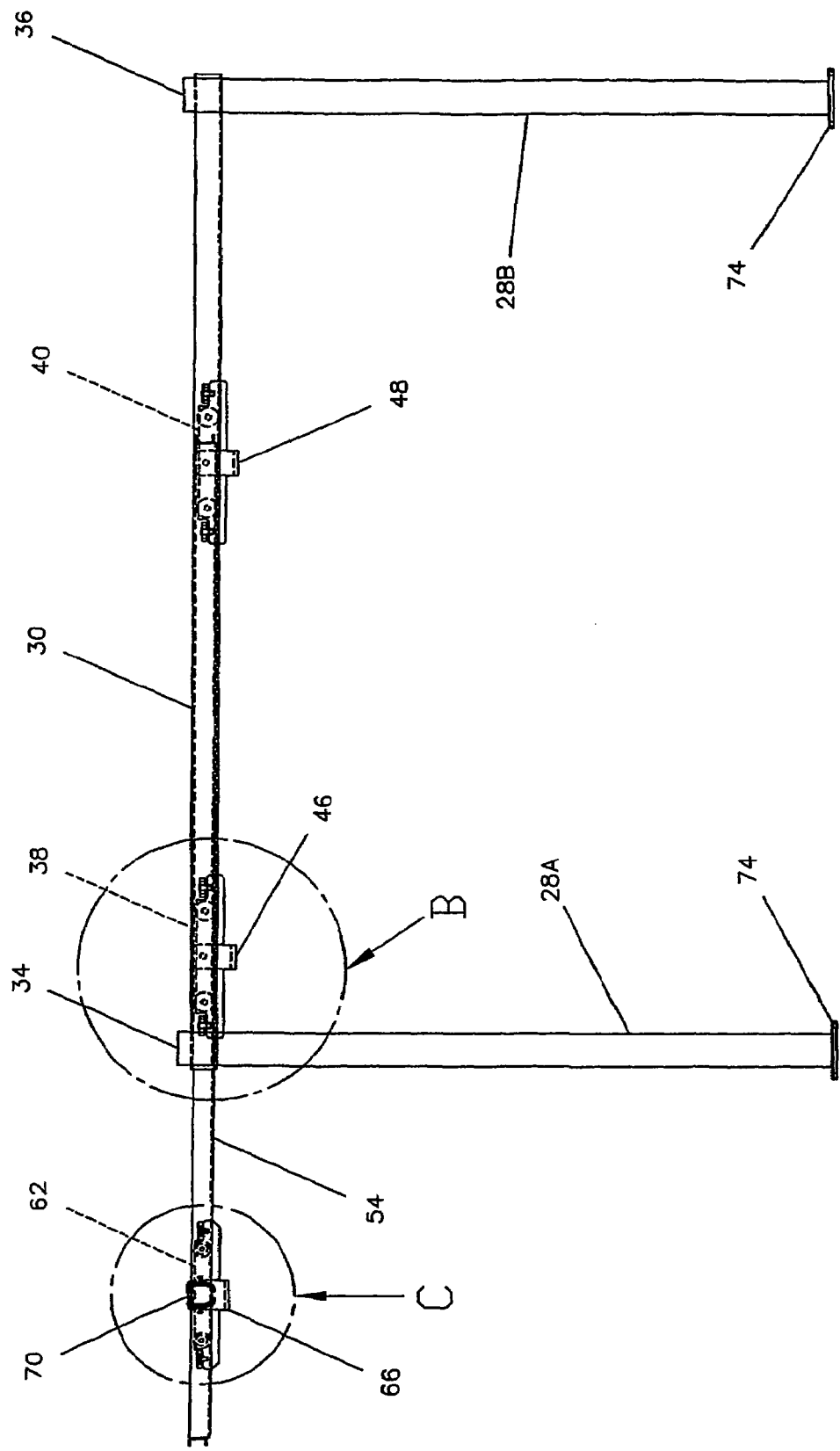
FIG. 4 is a side elevational view of the system shown in FIG. 1.
Figure 11:
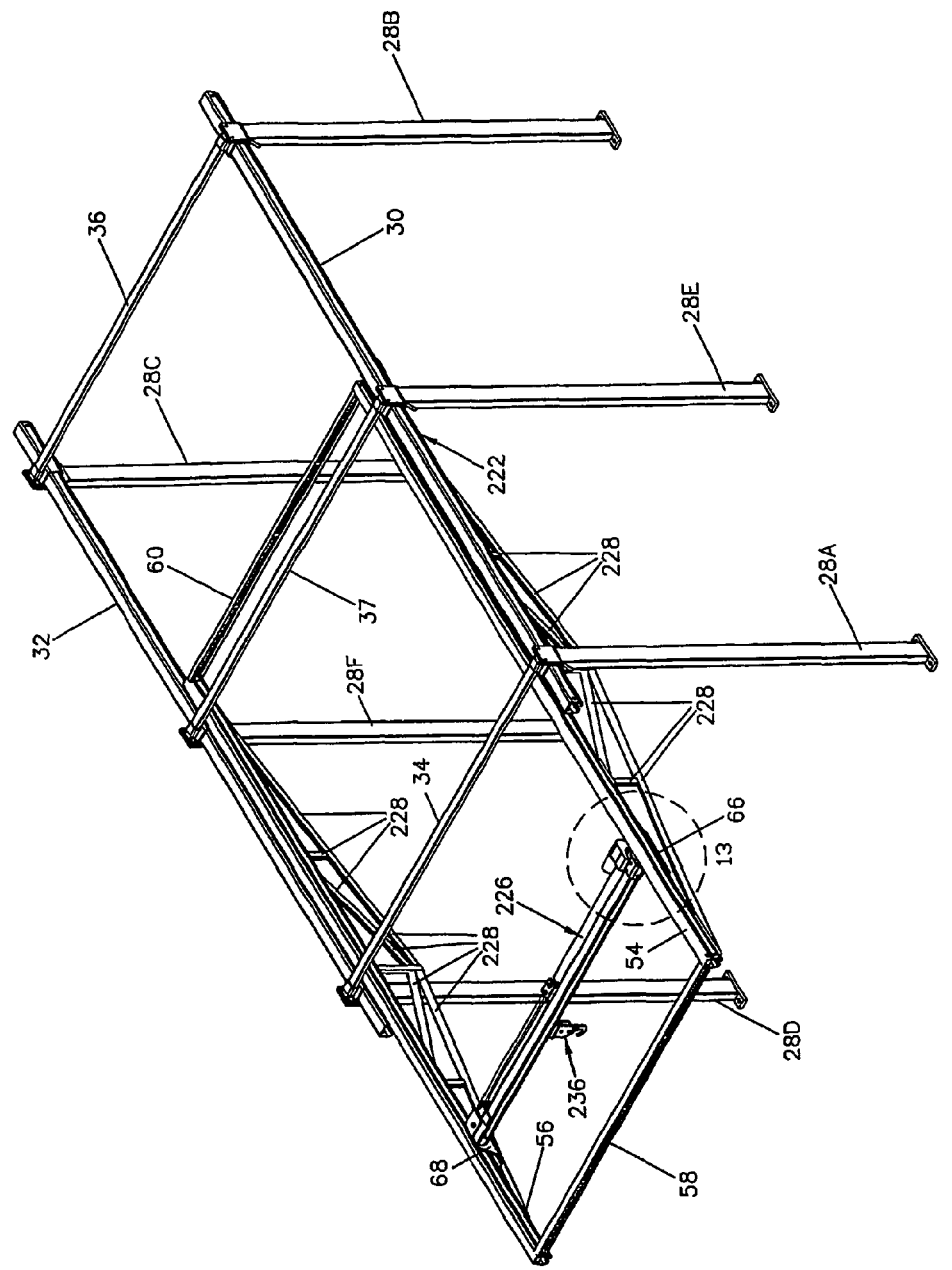
FIG. 11 is an isometric view similar to FIG. 1 but showing the another exemplary embodiment of the invention, e.g., a system like that of FIG. 1 with additionally bracing members for its movable runway frame assembly and also including an extremely low headroom hoist assembly mounted on a bridge member of the runway frame.

Turning now to FIGS. 4, 7 and 11 it can be seen that in that exemplary embodiment the support frame assembly 222 comprises six, upright support columns or posts 28A, 28B, 28C, 28D, 28E and 28F, a pair of outside tracks 30 and 32, three cross members 34, 36 and 37, four, trolleys or trucks 38, 40, 42, and 44 (FIGS. 4 and 7) and associated hangers 46, 48, 50, and 52 (FIGS. 4 and 7). The outside tracks 30 and 32 make up the heretofore identified pair of runways and are arranged to slidably support the runway frame assembly 224 therebetween.

The runway frame assembly 224 comprises a pair of inside tracks 54 and 56, two, cross members 58 and 60, a pair of trolleys or trucks 62 and 64 (FIGS. 6, 7 and 16), a pair of hangers 66 and 68 (FIGS. 2-4, 6, 9, 11, 12, 14 and 16), a bridge section 70 and plural bracing struts 228. In particular, one set of bracing struts 228 are secured, e.g., welded, to the inside track 54, while a like set of bracing struts 228 are secured, e.g., welded, to the inside track 56. Both sets of bracing struts 228 project downward from the associated track to which they are secured and thus serve to prevent the generally planar frame assembly from bending or bowing, particularly when supporting a heavy load. It should be pointed out at this juncture that the runway assembly 224 of the system 200 need not include these additional bracing struts, e.g., the runway assembly can be constructed similarly to system 20, or any other desirable arrangement.

In order to increase the amount of headroom between the floor on which the system 200 is mounted, e.g., a trailer floor, and the bottom of the hook or other lifting member, the lifting hook arrangement of the embodiment 20 has been replaced with the heretofore identified extremely low headroom hoist assembly 226. It must be pointed out at this juncture that in the exemplary embodiment of system 200 the low headroom hoist assembly 226 makes use of a conventionally shaped hook 262 (to be described later). However, such an arrangement is merely exemplary. Thus, other types of lifting devices, e.g., an electromagnet, a suction head, a chain, a belt, etc., can be used in lieu of the hook 262.

Figure 12:
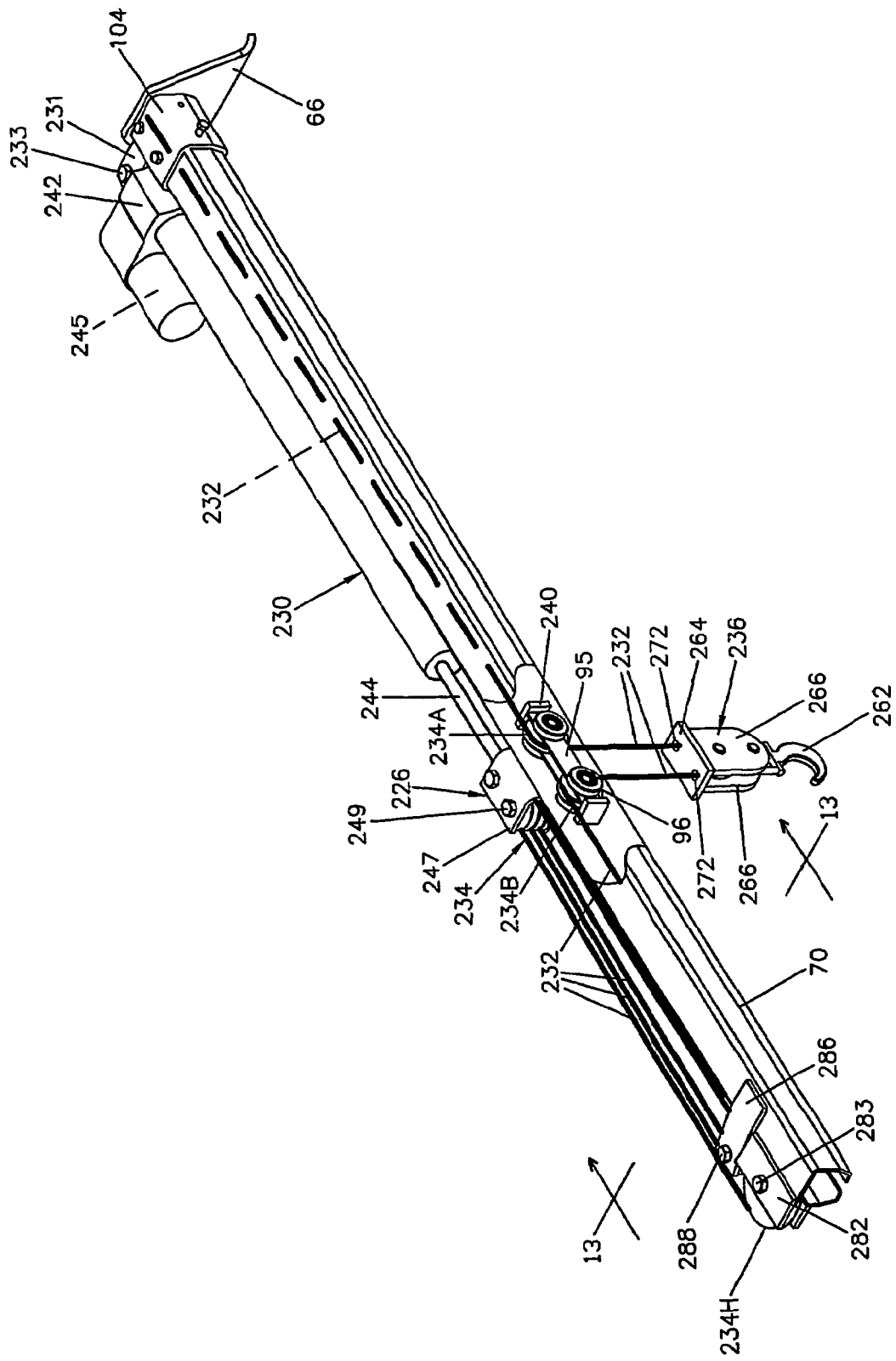
FIG. 12 is an enlarged isometric view, partially broken away, of the bridge member and the extremely low headroom hoist assembly mounted thereon.
Figure 13:
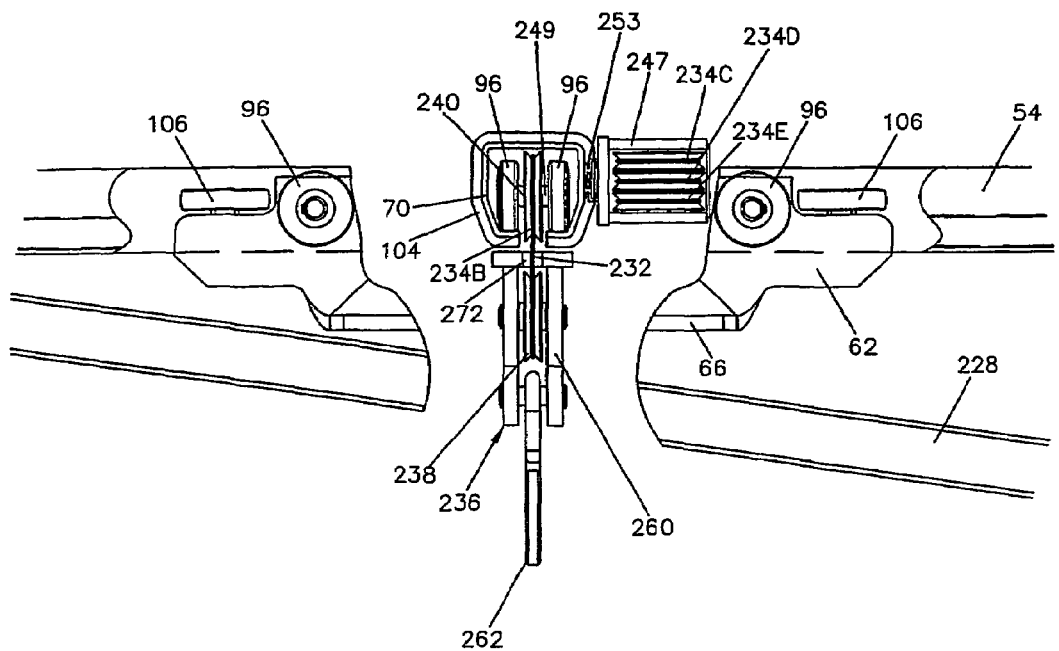
FIG. 13 is an enlarged view, partially broken away, taken along line 13-13 of FIG. 12.
Figure 15:
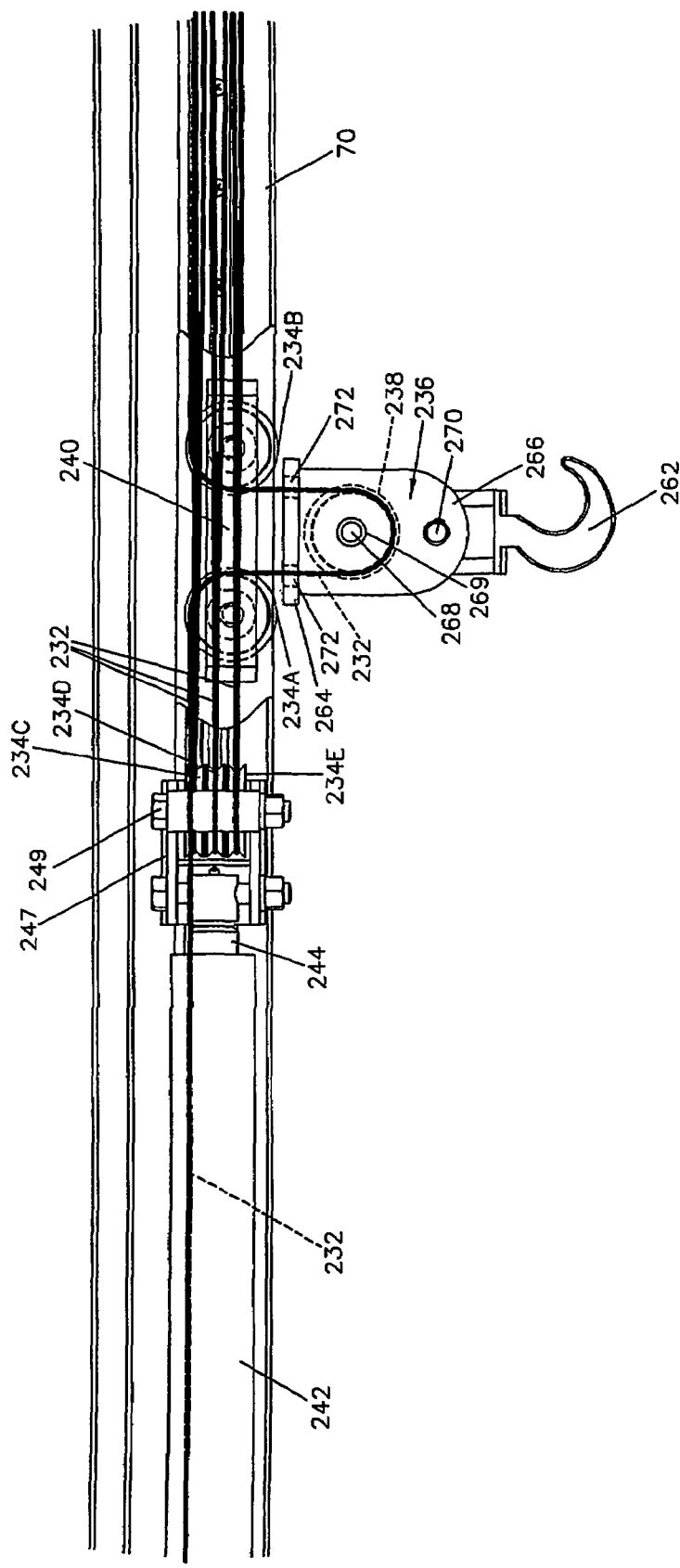
FIG. 15 is an enlarged view of a portion of the system shown within the circular area designated "15" in FIG. 14.
Figure 20:
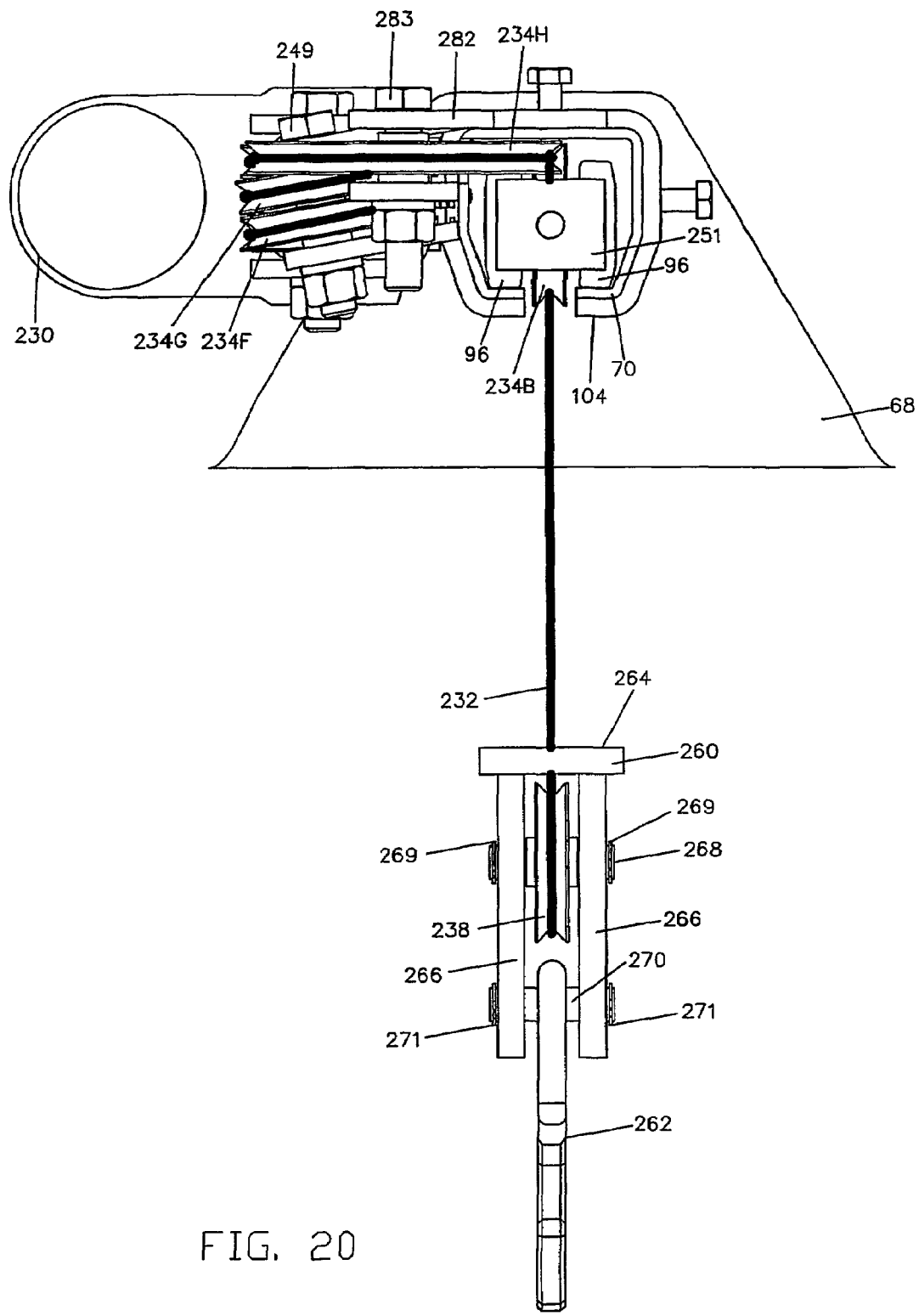
FIG. 20 is an enlarged end of the bridge member and the extremely low headroom hoist assembly mounted thereon taken from the opposite direction as FIG. 13.

The extremely low headroom hoist assembly 226 is supported on the bridge section 70. As best seen in FIG. 12, the extremely low headroom hoist assembly 226 basically comprises an actuator assembly 230 that is fixedly mounted on the bridge section 70, a flexible cable 232 coupled to the actuator assembly 230, a set of sheaves 234 (to be described later) mounted on the bridge section 70 and about which the cable 232 extends and is reeved, and a lifting hook assembly 236 carried by the cable 232. As best seen in FIGS. 13, 15 and 20 the lifting hook assembly 236 itself includes a sheave 238 about and under which the cable 232 extends to support the lifting hook assembly 236 on the cable. To that end, as will be described in detail later, the cable 232 includes one end that is fixedly secured to the bridge section 70. The remainder of the cable 232 and is arranged to extend around and under the sheave 238 of the lifting hook assembly 236 and around the sheaves of the set 234. Some of the sheaves of the set 234 are mounted on the bridge section 70, while others are mounted on a portion of the actuator assembly 230 and still others are mounted on a trolley located within the interior of the bridge section 70. The trolley 240 is arranged to roll along the interior of the bridge section 70 to carry the extremely low headroom hoist assembly to any lateral position between the tracks 54 and 56 of the runway section 224.

The actuator assembly 230 basically comprises a conventional electrically operated actuator including a housing 242 and an extendable rod 244 (FIGS. 12 and 15). The actuator assembly 230 is fixedly mounted on the bridge section 70 via a bracket 231 and associated bolt 233 and lock nut (hot shown). In particular, the bracket 231 is secured to the member 104 secured to the hanger 66. The member 104 serves to hold one end of the bridge section therein via cap screws 105.

The actuator assembly 230 may be operated by DC or AC. One particularly suitable AC operated actuator is that sold by Warner Linear of Marengo, Ill. under the model designation Electrak 5. One particularly suitable DC operated actuator is also sold by Warner Linear under the model designation Electrak 10. Other electrically operated actuators can be used. In fact, the actuator assembly need not be electrically operated, but can be hydraulic or pneumatic. In any case, the extendable rod 244 of the assembly is arranged to be reciprocated with respect to the housing 242 from a fully retracted position, like that shown in FIGS. 11, 14 and 15, to a fully extended position, and vice versa, by operation of an electrical actuator, e.g., a motor 245, located within the housing 242. The actuator rod 244 includes a free end on which several of the sheaves of the set 234 are mounted via a bracket 247. The cable is reeved about these sheaves (as will be described later).

It should be pointed out at this juncture that when the electrical motor of the actuator is operated (as will also be described later) it moves the actuator rod 244 so that its free end with the bracket-mounted sheaves thereon can be located at any intermediate position between the fully retracted position (FIGS. 11, 14 and 15) and the fully extended position (not shown). FIG. 12 shows the actuator rod in one exemplary intermediate position.

Figure 14:
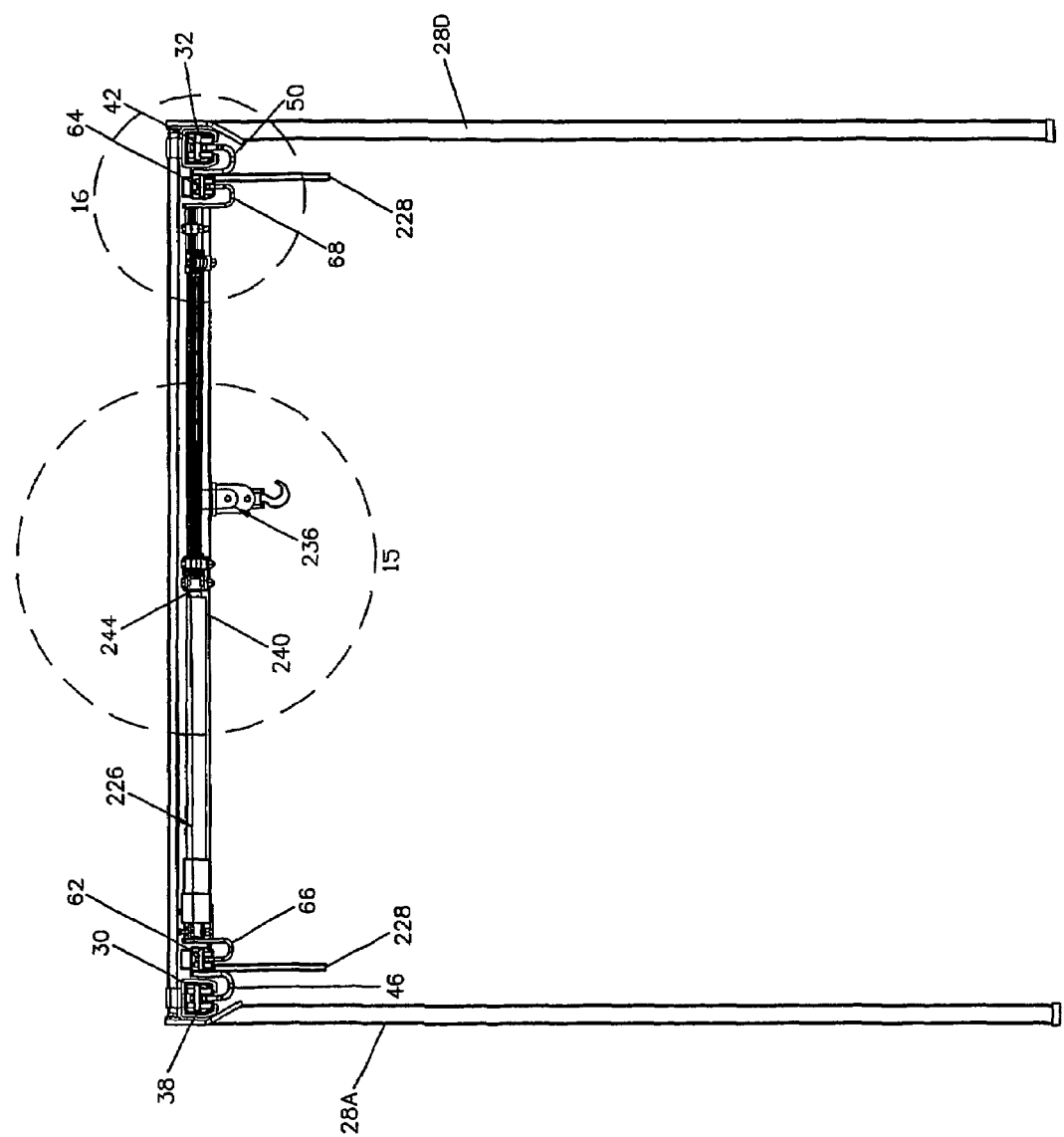
FIG. 14 is a front elevational view of the embodiment of FIG. 11.

When the actuator rod is in its fully retracted position, like that shown in FIGS. 14 and 15 the sheaves mounted on the free end of that rod will be located immediately adjacent the end of the housing 240 and approximately in the middle of the length of the bridge section 70. When the rod is in its fully extended position its free end with the sheaves mounted thereon, will be located closer to the opposite end of the bridge section 70. As will be described later when the actuator rod is in its fully retracted position the cable 232 will be retracted to the maximum amount permitted by the low headroom hoist assembly 226, whereupon the lifting hook assembly 236 will be at its highest position with respect to the floor over which it is suspended. Conversely, when the actuator rod is in its fully extended position the cable will be extended to its maximum amount so that lifting hook assembly will be at its lowest position with respect to the floor. As should be appreciated by those skilled in the art, the amount of displacement of the lifting hook assembly 226 with respect to the floor is a function of the amount of extension/retraction of the actuator rod and the associated cable and the amount of reeving of the cable.

As will also be described in detail later and as mentioned above, in the exemplary embodiment of FIGS. 11-20 the flexible cable 232 is reeved about several sheaves of the set 234. This arrangement increases the amount of displacement of the lifting hook assembly for a given displacement of the actuator rod. In particular, the reeving of the cable back and forth about the multiple sheaves results in a pulley-like arrangement, which in the exemplary embodiment exhibits a six-to-one increase in cable movement at the lifting hook assembly for each movement (extension or retraction) of the extendable actuator rod 244. Moreover, since the cable 232 runs from actuator rod on the bridge section 70 and about the associated sheaves forming the pulley arrangement (which are also located on the bridge section) above the lifting hook assembly, then downward under the sheave 238 of the lifting hook assembly and then back upward to the fixed point on the bridge section, there is a one-to-two reduction of the movement of the lifting hook assembly 236 up or down for each movement of cable 232 with respect to the hook assembly sheave 238. Accordingly, with this arrangement the extension/retraction of the actuator rod 244 of one foot will result in the lowering/raising of the lifting hook assembly by three feet. Depending upon the number of sheaves and reeving, any desired mechanical advantage/travel ratio may be achieved for a particular application. Thus, it must be kept in mind that the embodiment shown and described herein is merely exemplary.

Figure 18:
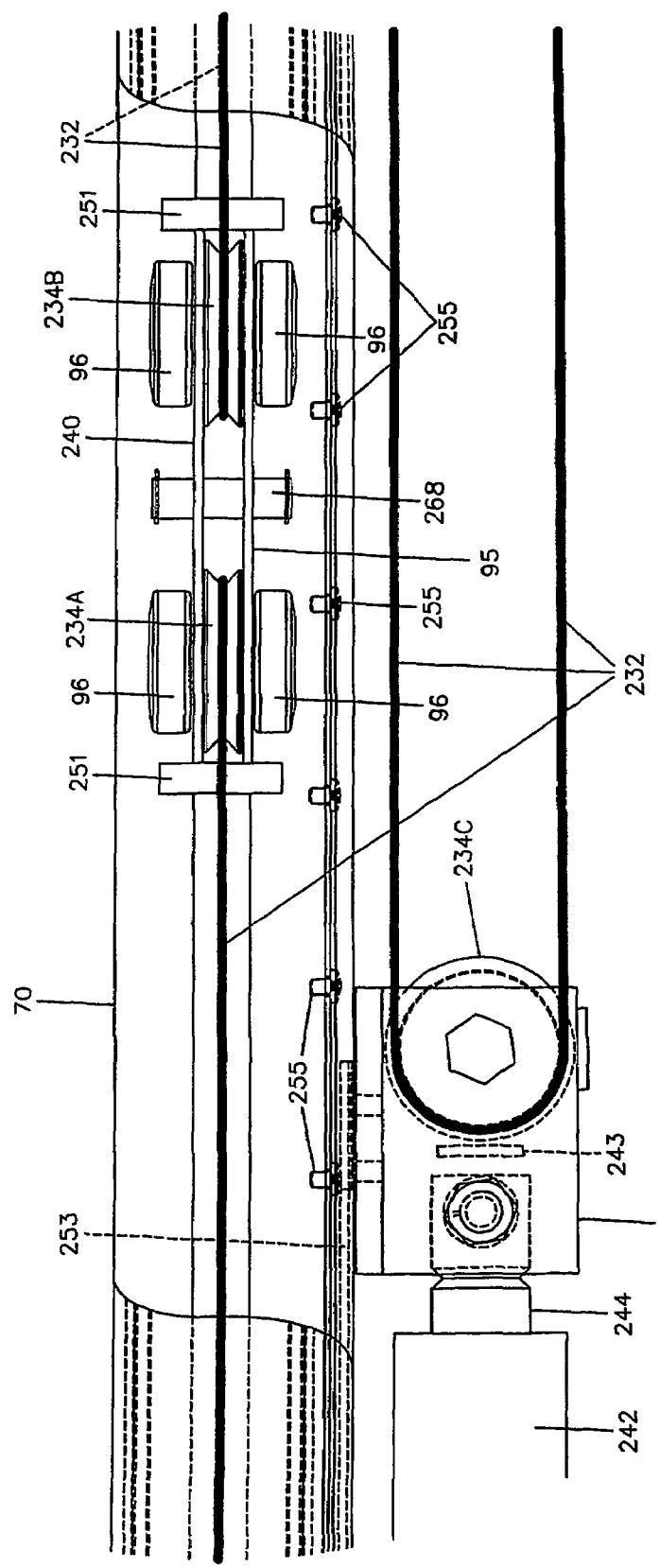
FIG. 18 is an enlarged view of a portion of the system shown within the circular area designated "18" in FIG. 17.

As mentioned earlier, there is a trolley or truck 240 located within the interior of the bridge section 70 to roll therealong to effect the lateral positioning of the lifting hook assembly 226. As best seen in FIGS. 12, 15 and 18, the trolley 240 carries a pair of sheaves 234A and 234B of the set 234. The sheaves 234A and 234B are each rotatable circular members which are supported by the body 95 of the trolley 240 (FIGS. 12, 15, 18 and 20). Each sheave includes a peripheral groove for receipt of the cable 232 therein. The trolley 240 also includes four wheels 96, e.g., polymide wheels with ball bearings mounted on axles 249 (FIG. 13). These axles also mount the sheaves 234A and 234B onto the truck 240. The wheels 96 are arranged to roll on respective inner surfaces of the flanges 92 on opposite sides of the slot 94 in the track of the bridge section 70 so that the trolley can be located at any longitudinal position therealong. The trolley 40 serves to directly support the lifting assembly 236 below it. To that end, the cable 232 extends from other sheaves of the set 234 to the trolley-mounted sheave 234A, where it enters the sheave's peripheral groove from the top and then extends downward vertically to the sheave 238 of the lifting hook assembly 236. That sheave is constructed similarly to sheave 234A and also includes a groove in its periphery. Thus, the cable 232 enters into the groove of the lifting hook assembly sheave 238 from above, passes below that sheave (yet still within the peripheral groove) and then extends upward into the peripheral groove of the other sheave 234B carried by the trolley 240. From there the cable 232 extends horizontally to a fixed connection point 252 (FIG. 12) at the end of the bridge section 70 where the actuator assembly 230 is mounted. Thus, the cable 232 supports the lifting hook assembly 236 from the trolley 240.

As best seen in FIGS. 18 and 20, the trolley 240 also includes a pair of drop lugs 251 at respective ends of its body 95. The drop lugs are provided for safety in case the axle(s) on which the wheels 96 are mounted fail.

The lifting hook assembly 236 is best seen in FIGS. 13, 15 and 20 and basically comprises the heretofore identified sheave 238, a guard member 260 and the heretofore identified hook 262. The guard member 12 basically comprises a top plate 264 and a pair of side plates 266. As best seen in FIG. 20, the sheave 238 is mounted on an axle 268 extending between the side plates 266. The axle is held in place by snap rings 269. When so mounted the sheave 238 is able to rotate about the axis of the axle. As mentioned above, the peripheral edge of the sheave 238 is also grooved to enable the cable 232 extending from and to the sheaves 234A and 234B, respectively, of the trolley 240 to be received therein. The hook 262 is a conventionally shaped member and is mounted on a support pin 270 (FIG. 20) extending between the side plates 266 below the sheave 238. The pin 270 is held in place by a pair of snap rings 271. The hook is free-swinging on the pin 270. The top plate 264 includes a pair of openings or holes 272 (FIGS. 12, 13 and 15) through which the cable 232 passes from and to the sheaves 234A and 234B of the trolley 240.

Figure 16:
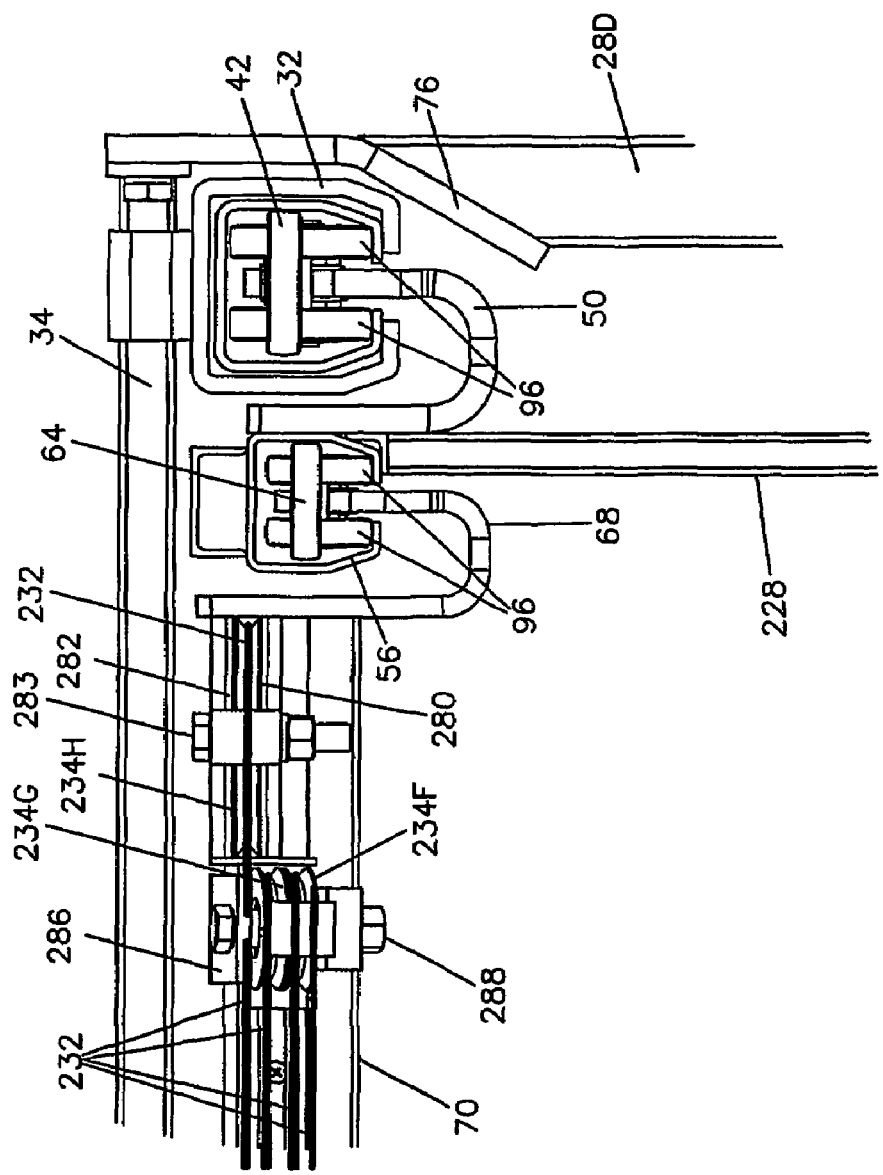
FIG. 16 is an enlarged view of a portion of the system shown within the circular area designated "16" in FIG. 14.
Figure 17:
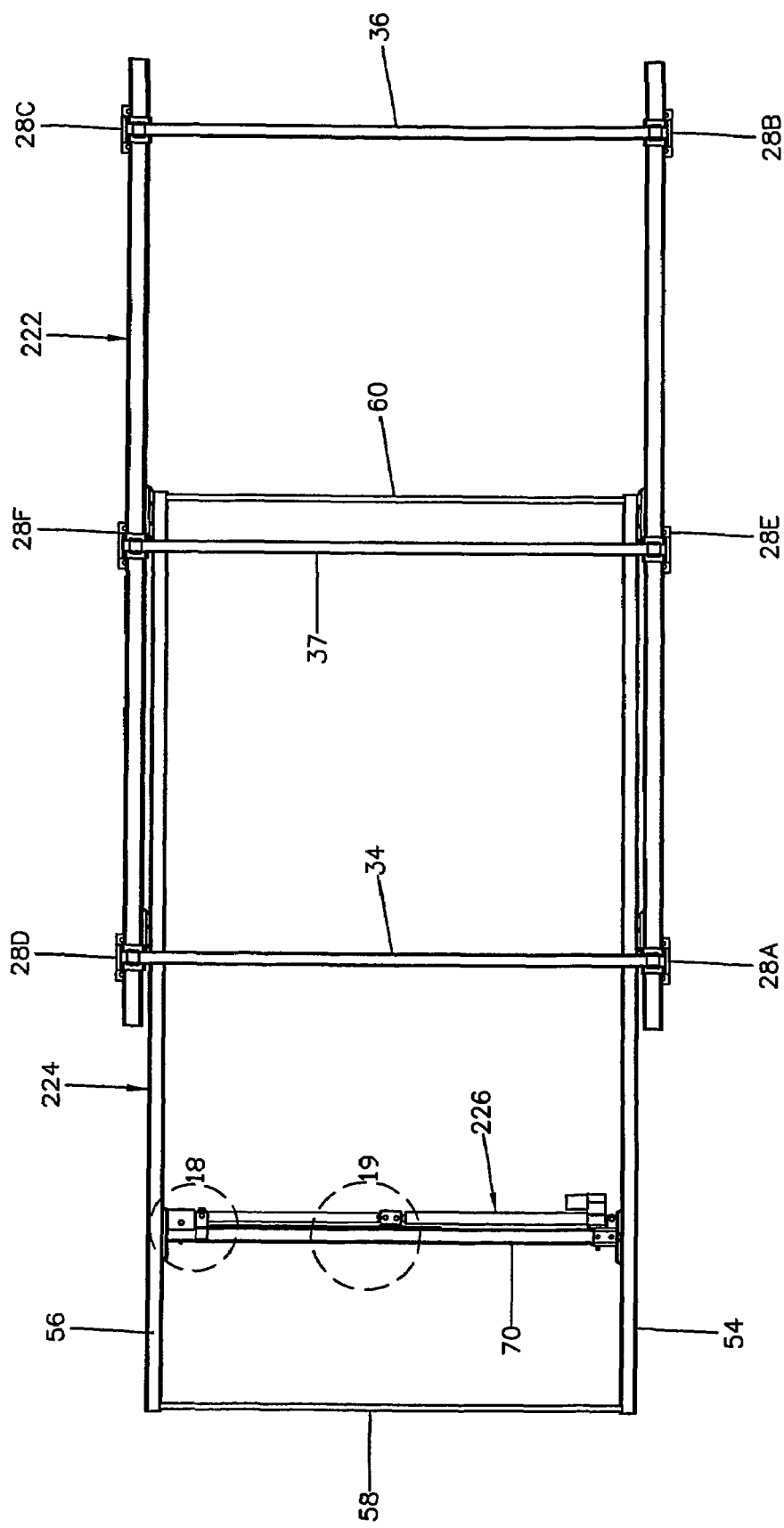
FIG. 17 is a top plan view of the embodiment of the invention of FIG. 11.
Figure 19:
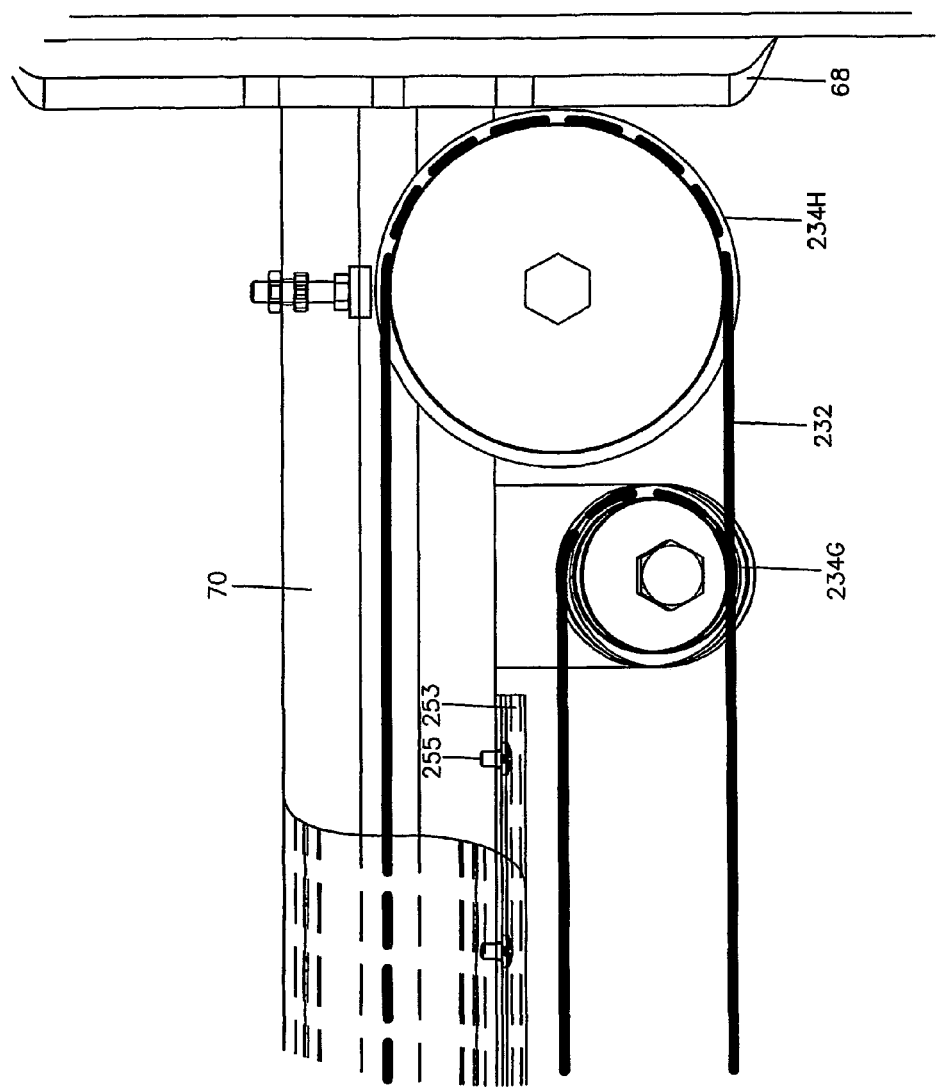
FIG. 19 is an enlarged view of a portion of the system shown within the circular area designated "19" in FIG. 17.

As best seen in FIG. 12 the portion of the cable 232 extending to the sheave 234B of the trolley 240 is located within the interior of the bridge section 70 and extends along the longitudinal axis of the bridge section. The cable enters the interior of the bridge section via an opening 280 (FIG. 16) in the bridge section's side wall closely adjacent the end to which the hanger 68 is secured. In particular, the assembly 226 also includes a sheave 234H (FIGS. 12, 16 and 19) which is mounted on the bridge section 70 via a bracket 282 and an associated bolt 283. The sheave 234H is one of the sheaves of the set 234 and is of similar construction to the other sheaves thereof, i.e., it is a rotatable member having a peripheral groove to receive the cable 232 therein. An adjustable tab 285 (FIG. 19) is mounted on the bridge section 70 to prevent the cable from coming off of the sheave 234H. The sheave 234H is somewhat larger in size than the sheaves 234A and 234B and is mounted horizontally for rotation about the vertically oriented bolt 283 (FIGS. 12 and 16) supported by the bracket 282. Thus, the portion of the cable from the sheave 234A extends horizontally down the interior of the bridge section 70, out through the opening 280 and into the peripheral groove of the sheave 234H. From there the cable 232 passes horizontally outside and parallel to the bridge section 70 to other of the sheaves making up the set 234. These other sheaves make up the heretofore mentioned six-to-one pulley arrangement. In particular, as best seen in FIG. 16, two sheaves 234F and 234G are fixedly mounted on the bridge section 70 adjacent the sheave 234H via a bracket 286 and associated bolt 288. The sheaves 234F and 234G are of similar construction to sheaves 234A and 234B. The cable 232 is reeved about the sheaves 234F and 24G and about three other sheaves 234C, 234D and 234E of the set 234. The sheaves 234C, 234D and 234E are of similar construction to sheaves 234A and 234B and mounted on the free end of the extendable actuator rod 244 via the bracket 247 and associated bolt 249 and lock nuts (not shown) (FIG. 15). In order to ensure that the sheaves 234C, 234D and 234E that are mounted on the end of the actuator rod can move as a unit parallel to the bridge section a guide member 253 is mounted on the outer surface of the bridge section via plural screws 255 as best seen in FIGS. 13, 18 and 19. A tab 243 (FIG. 18) is mounted on the bracket 247 adjacent the sheaves 234C, 234D and 234E to prevent the cable from coming off those sheaves.

As best seen in FIGS. 16 and 20 the sheave 234F is located below the sheave 234G. The axle 249 extends at an acute angle to horizontal so that each sheave 234F and 234G is oriented so that it is able to rotate in a plane at an acute angle to the horizontal. This feature ensures that the cable portions that are reeved about these sheaves and the cooperating sheaves 234C, 234D and 234E on the actuator rod have a clear, interference-free horizontal path between the sheaves. The other end of the cable from the end 232 connected to the bridge section 70 at point 252 is fixedly secured to a bracket (not shown) mounted on the bridge section immediately adjacent the angularly oriented sheave 234E.

As should be appreciated from the foregoing the system 200 has significant advantages over existing hoists for use with overhead bridge cranes, even if the bridge crane is constructed in accordance with the teachings of the embodiment of the system 20. In particular, prior art systems exhibit the disadvantage of reducing the headroom that is available. That is the vertical length of the hoist reduces the maximum height that the load can be lifted. Optimally the maximum height that the load can be lifted would be the height of the bridge crane or bridge member itself. The subject invention comes close to achieving that desired goal in that the lifting hook assembly 236 of the extremely low headroom hoist assembly 226 can be brought very close to the bridge section 70 as shown clearly in FIGS. 13 and 14. This is readily accomplished by merely operating the motor of the hoist assembly 226 to cause its associated actuator rod 244 to move to its fully retracted position. This action retracts the cable 232, thereby raising the lifting hook assembly 236 until it is immediately adjacent the bridge section 70. To lower the lifting hook assembly to any intermediate position or to the fully extended position all that is required is to operate the actuator to enable the actuator rod to extend outward to the desired intermediate or fully extended position, thereby enabling the cable to be carried downward by the weight of the lifting hook assembly. The load can then be attached to the lifting hook 262 and then lifted by operating the actuator mechanism to retract the actuator rod and the cable coupled thereto, thereby lifting the load to any intermediate height or to the maximum height off the floor. The positioning of the load at any lateral position can be readily accomplished by merely pushing on the load from one side, whereupon the force applied to the load causes the trolley 240 which supports the lifting hook assembly to move in the direction of the applied force.

Another advantage of the extremely low headroom hoist assembly is that the actuator components are located within the plane of the bridge member 70, thereby minimizing the chance of collisions with the operator of the system 200.

As discussed above the system 200 makes use of a pulley-like arrangement to effect a mechanical advantage for the displacement of the cable. That feature is merely exemplary. Thus, the system 200 need not include a six-to-one pulley arrangement or any pulley arrangement for that matter, e.g., one end of the cable 232 can be directly connected to the actuator rod 244 and the other end of the cable to a portion of the bridge member 70, with the cable running around a sheave to enable it to pass from the outside of the bridge member into the inside of the bridge member and around the sheaves of the trolley 240 and the lifting hook assembly 236 carried thereby.

It should also be pointed out that the extremely low headroom lifting assembly 226 of the subject invention can be used with other crane structures or systems than that of system 20. Moreover, the system 20 can be used with other lifting mechanisms or assemblies than the extremely low headroom lifting assembly 226. Further still the various components making up the systems 20 and 200 are merely exemplary of various components that could be used in the context of this invention.

Without further elaboration the foregoing will so fully illustrate my invention that others may, by applying current or future knowledge, adopt the same for use under various conditions of service.

I claim:

1. A system for suspending a load over a floor, said system comprising a first, second, third, and fourth elongated, enclosed, hollow tracks, plural elongated cross members, a plurality of trucks, and a plurality of generally U-shaped hangers, each of said tracks including a longitudinally extending slot, each of said hangers having a downwardly extending leg, an intermediate section and an upwardly extending leg, said first and second tracks being disposed parallel to each other over the floor, said third and fourth tracks being disposed parallel to each other and interconnected by at least one of said cross members to form a runway frame, a first one of said trucks being located within said first track and arranged to move along the interior of said first track, a second one of said trucks being located within said second track and arranged to move along the interior of said second track, said first truck being connected to said downwardly extending leg of a first of said hangers, with a portion of said first hanger passing through said slot in said first track, said upwardly extending leg of said first hanger being connected to said third track to support said third track beside and parallel to said first track, said second truck being connected to said downwardly extending leg of a second of said hangers and an elongated bridge member adapted to have the load coupled thereto for suspending the load over the floor, said elongated bridge member being connected between said third and fourth tracks, with a portion of said second hanger passing through said slot in said second track, said upwardly extending leg of said second hanger being connected to said fourth track to support said fourth track beside and parallel to said second track, whereupon said runway frame is disposed horizontally between said first and second tracks and can be slid in a horizontal plane from a retracted position to an extended position and vice versa.

2. The system of claim 1 additionally comprising a third truck located within said first track, a third hanger connected to said third truck, a fourth truck located within said second track, and a fourth hanger connected to said fourth truck, said third truck being connected to said downwardly extending leg of said third hanger, with a portion of said third hanger passing through said slot in said first track, said upwardly extending leg of said third hanger being connected to said third track, said fourth truck being connected to said downwardly extending leg of said fourth hanger, with a portion of said fourth hanger passing through said slot in said second track, said upwardly extending leg of said fourth hanger being connected to said fourth track.

3. The system of claim 2 wherein said elongated bridge member is connected transversely between said third and fourth tracks.

4. The system of claim 3 additionally comprising fifth and sixth trucks, and fifth and sixth hangers, and wherein said elongated bridge member comprises a pair of ends, said fifth truck being located within said third track and arranged to move along the interior of said third track, said fifth truck being connected to said downwardly extending leg of said fifth hangers, with a portion of said fifth hanger passing through said slot in said third track, said upwardly extending leg of said fifth hanger being connected to one of said ends of said bridge member, said sixth truck being located within said fourth track and arranged to move along the interior of said fourth track, said sixth truck being connected to said downwardly extending leg of said sixth hanger, with a portion of said sixth hanger passing through said slot in said fourth track, said upwardly extending leg of said sixth hanger being connected to the other of said ends of said bridge member, whereupon said bridge member can be slid in a horizontal plane to various longitudinal positions along said runway frame.

5. The system of claim 4 wherein each of said trucks includes plural wheels for rolling along the interior of the track in which it is located.

6. The system of claim 1 wherein said elongated bridge member is connected transversely between said third and fourth tracks.

7. The system of claim 6 additionally comprising fifth and sixth trucks, and fifth and sixth hangers, and wherein said elongated bridge member comprises a pair of ends, said fifth truck being located within said third track and arranged to move along the interior of said third track, said fifth truck being connected to said downwardly extending leg of said fifth hanger, with a portion of said fifth hanger passing through said slot in said third track, said upwardly extending leg of said fifth hanger being connected to one of said ends of said bridge member, said sixth truck being located within said fourth track and arranged to move along the interior of said fourth track, said sixth truck being connected to said downwardly extending leg of said sixth hanger, with a portion of said sixth hanger passing through said slot in said fourth track, said upwardly extending leg of said sixth hanger being connected to the other of said ends of said bridge member, whereupon said bridge member can be slid in a horizontal plane to various longitudinal positions along said runway frame.

8. The system of claim 7 wherein each of said trucks includes plural wheels for rolling along the interior of the track in which it is located.

9. The system of claim 1 wherein each of said trucks includes plural wheels for rolling along the interior of the track in which it is located.

10. The system of claim 1 additionally comprising plural upstanding posts for supporting said first and second tracks above the floor.

11. The system of claim 1 wherein said system is arranged to utilized with a vehicle, said vehicle including a hollow body bounded by plural upstanding walls, a ceiling, a floor, and an openable entry thereto, said system being arranged to be mounted within said hollow body immediately adjacent the ceiling to provide maximum clearance space between said system and the floor.

12. The system of claim 11 wherein said runway frame is arranged to be extended out of the openable entry in the hollow body of the vehicle.

13. The system of claim 1 wherein said elongated bridge member comprises a low headroom hoist assembly, said low headroom hoist assembly comprising an actuator, a flexible cable, plural sheaves and a hook, said actuator including a housing fixedly secured on said bridge member in said common horizontal plane and an extendable member also located in said common horizontal plane, said extendable member being arranged to be moved with respect to said housing from a fully retracted position to a fully extended position and vice versa, said cable being coupled to said extendable member, a first one and a second one of said sheaves being mounted on said bridge member in said common horizontal plane spaced from each other, said first and second sheaves being rotatable about respective horizontal axes, said axes of said first and second sheaves being parallel to each other and located in said common horizontal plane, said hook being secured to a third sheave, said third sheave being rotatable about a horizontal axis and arranged to be moved between a fully retracted position, wherein said third sheave is located between said first and second sheaves, and a fully extended position, wherein said third sheave is located below said first and second sheaves, said cable extending from said extendable member over said first sheave, under said third sheave, and over said second sheave and having a first end portion fixedly secured to said bridge member, the movement of the extendable member of the actuator to said fully retracted position with respect to said housing causing said cable to slide with respect to at least some of said sheaves to move said third sheave to said fully retracted position between said first and second sheaves and in said common horizontal plane thereby raising said hook to the maximum distance above the floor, the movement of said extendable member to said fully extended position with respect to said housing enabling said cable to slide with respect to at least some of said sheaves so that said third sheave moves downward under the force of gravity, thereby lowering said hook toward the floor.

14. The system of claim 13 wherein said first and second sheaves are mounted on a wheeled truck for slidable movement along said bridge member.

15. The system of claim 14 wherein said bridge member is slidably mounted on said runway frame by a pair of said trucks coupled to said third and fourth tracks.

16. The system of claim 14 wherein said cable is fixedly secured to said extendable member.

17. The system of claim 14 additionally comprising a pulley arrangement having plural sheaves about which said cable is reeved to result in an increased movement of the hook up or down with respect to the floor for each movement of the actuator member between said retracted and extended positions and vice versa.

18. The system of claim 17 wherein said pulley arrangement comprises a fourth sheave rotatably mounted on said extendable member, said cable being slidable with respect to said fourth sheave and having a second end portion fixedly secured to said bridge member.

19. The system of claim 18 wherein said pulley arrangement additionally comprising a fifth sheave rotatably mounted on said extendable member, said cable being slidable reeved about said fourth and fifth sheaves.

20. The system of claim 17 wherein each of said plural sheaves of said pulley arrangement are rotatable about an axis which is at an acute angle to said common horizontal plane.

21. The system of claim 14 additionally comprising a guide sheave mounted on said bridge member and over which said cable extends to said first sheave.

22. The system of claim 13 wherein said bridge member is slidably mounted on said runway frame by a pair of said trucks coupled to said third and fourth tracks.

23. The system of claim 13 additionally comprising a guard in which said third sheave is mounted for rotation about said horizontal axis.

24. The system of claim 13 wherein said cable is fixedly secured to said extendable member.

25. The system of claim 13 additionally comprising a pulley arrangement having plural sheaves about which said cable is reeved to result in an increased movement of the hook up or down with respect to the floor for each movement of the actuator member between said retracted and extended positions and vice versa.

26. The system of claim 25 wherein said pulley arrangement comprises a fourth sheave rotatably mounted on said extendable member, said cable being slidable with respect to said fourth sheave and having a second end portion fixedly secured to said bridge member.

27. The system of claim 26 wherein said pulley arrangement additionally comprising a fifth sheave rotatably mounted on said extendable member, said cable being slidable reeved about said fourth and fifth sheaves.

28. The system of claim 25 wherein each of said plural sheaves of said pulley arrangement are rotatable about an axis which is at an acute angle to said common horizontal plane.

29. The system of claim 13 additionally comprising a guide sheave mounted on said bridge member and over which said cable extends to said first sheave.

30. The system of claim 1 additionally comprising a hoist mounted on said elongated bridge member for suspending the load over the floor.

* * * * *